(12) United States Patent
Lu et al.

(10) Patent No.: US 8,300,016 B2
(45) Date of Patent: Oct. 30, 2012

(54) ELECTRONIC DEVICE SYSTEM UTILIZING A CHARACTER INPUT METHOD

(75) Inventors: Chi-Chang Lu, Taipei Hsien (TW); Chen-Hong Chao, Taipei Hsien (TW); Ming-Chien Hung, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 623 days.

(21) Appl. No.: 12/432,734

(22) Filed: Apr. 29, 2009

(65) Prior Publication Data

US 2009/0273566 A1    Nov. 5, 2009

(30) Foreign Application Priority Data

May 2, 2008    (TW) ................................ 97116277 A

(51) Int. Cl.
*G06F 3/041* (2006.01)

(52) U.S. Cl. ........ 345/168; 345/156; 345/173; 345/184; 715/773; 715/810; 715/816; 715/817; 715/840; 715/864

(58) Field of Classification Search ........... 345/156–158
See application file for complete search history.

(56) References Cited

U.S. PATENT DOCUMENTS 6,370,363 B1 * 4/2002 Fukuzato ..................... 455/90.1

FOREIGN PATENT DOCUMENTS

TW    200410551 A    6/2004

* cited by examiner

*Primary Examiner* — Kevin M Nguyen
*Assistant Examiner* — Cory Almeida
(74) *Attorney, Agent, or Firm* — Altis Law Group, Inc.

(57) ABSTRACT

A character input method is implemented in a device with a plurality of keys. If a key is activated by a first operation matching a first input pattern, a first route is selected to traverse a plurality of characters corresponded by the key during presentation of the plurality of characters. If the first key is activated by a second operation matching a second input pattern, the plurality of characters corresponded by the first key are orderly retrieved and presented according to a second route in response to operations on the first key. The order for presenting two characters corresponded by the first key in the first route is reversed in the second route.

110 Claims, 23 Drawing Sheets

ELECTRONIC DEVICE SYSTEM UTILIZING A CHARACTER INPUT METHOD

CROSS-REFERENCE TO RELATED APPLICATIONS

This application claims the benefit of priority from Taiwan Patent Application No. 097116277, filed May 2, 2008. The entirety of the above-mentioned patent application is hereby incorporated by reference herein in its entirety.

BACKGROUND

1. Technical Field

The present disclosure relates to computer techniques, and more particularly to electronic device systems utilizing modified character input methods.

A cell phone is not very convenient for text input since it is typically equipped with a numeric keypad rather than an alphanumeric keyboard. For example, because 26 letters are mapped to 8 numeric keys means that one numeric key would have to represent three to four letters.

In an existing input method, one keystroke on a key representing "A", "B", and "C" can be recognized as to present a character candidate "A", two keystrokes to present "B", and three keystroke to present "C". Inputting character "C" is always more complex and difficult than "A" and liable to lead to mistakes. For example, inputting "C" requires repeatedly and rapidly pressing a specific key three times, during which "A", "B", and "C" are orderly presented. An additional key press causes the desired "C" to be missed and leads to reiteration of "A", "B", and "C", which is very troublesome and time consuming.

DETAILED DESCRIPTION

Description of exemplary embodiments of a character input method and an electronic device utilizing the same is given in the following paragraphs which are organized as:
1. System Overview
2. Exemplary Embodiments of Character Input Methods

| | |
|---|---|
| 2.1 | First Exemplary Embodiment of Character Input Method |
| 2.2 | Second Exemplary Embodiment of Character Input Method |
| 2.3 | Third Exemplary Embodiment of Character Input Method |

3. Variation of Embodiments

| | |
|---|---|
| 3.1 | Alternative Embodiments of Character Input Method |
| 3.2 | Alternative Embodiments of the Electronic Device |

4. Conclusion

1. SYSTEM OVERVIEW

The character input method can be implemented in various electronic devices, such as cell phones, personal digital assistants (PDAs), set-top boxes (STB), televisions, or media players. An example of an electronic device implementing the character input method is given in the following.

Figure 1:
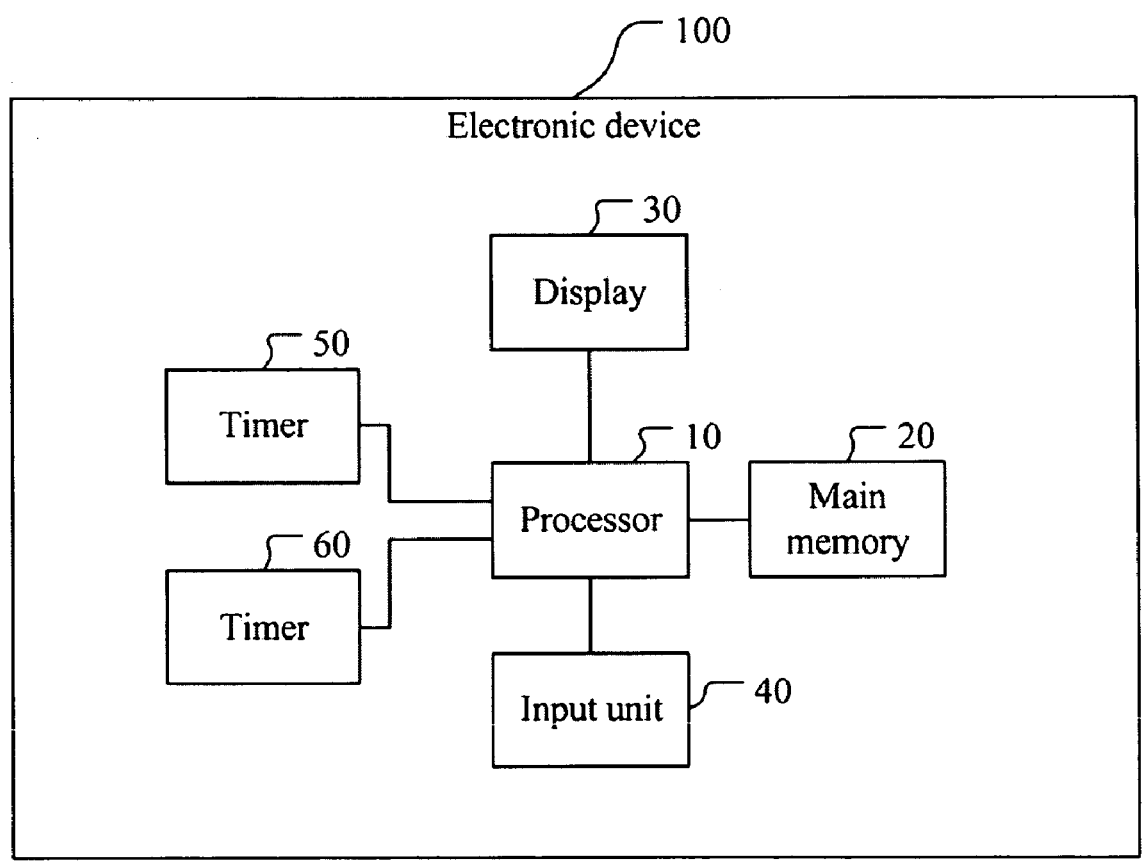
FIG. 1 is a block diagram of an embodiment of an electronic device.
Figure 10:
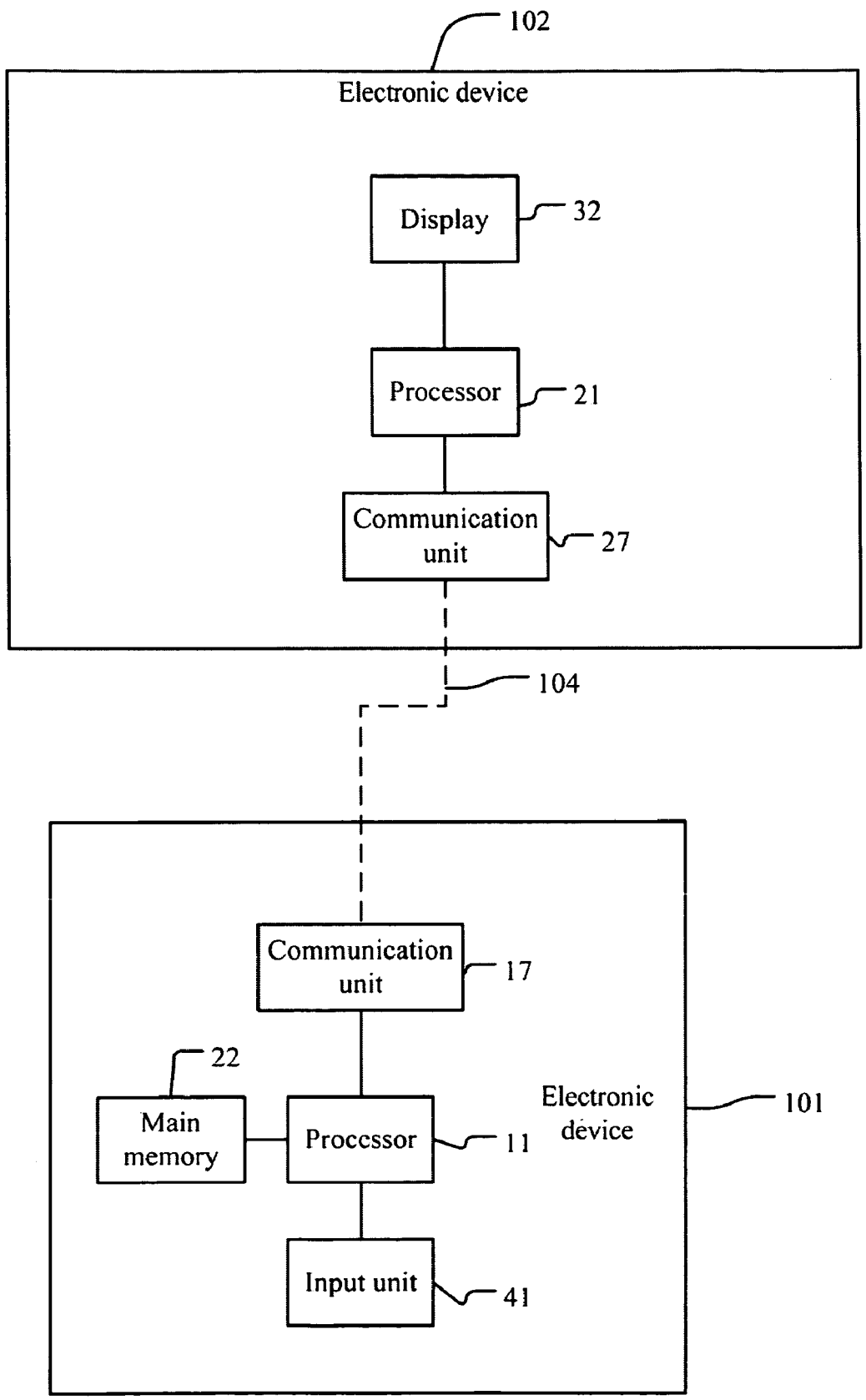
FIG. 10 is a block diagram of an embodiment of an electronic device system in which an electronic device with a input device and an electronic device with a display transfer text to each other through a communication channel.
Figure 11:
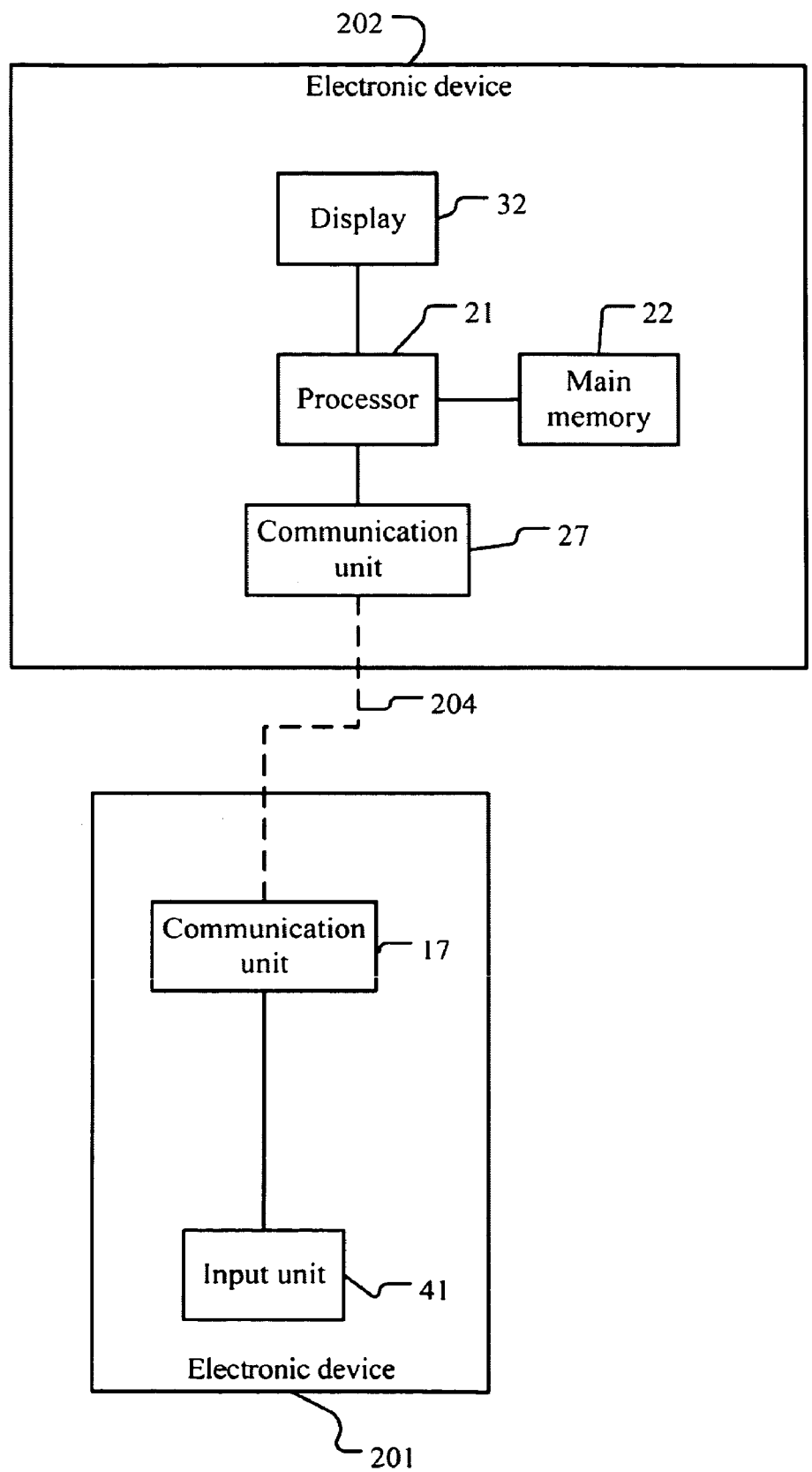
FIG. 11 is a block diagram of another embodiment of the electronic device system in which an electronic device with a display receives control signals for text input through a communication channel from an external source.
Figure 12:
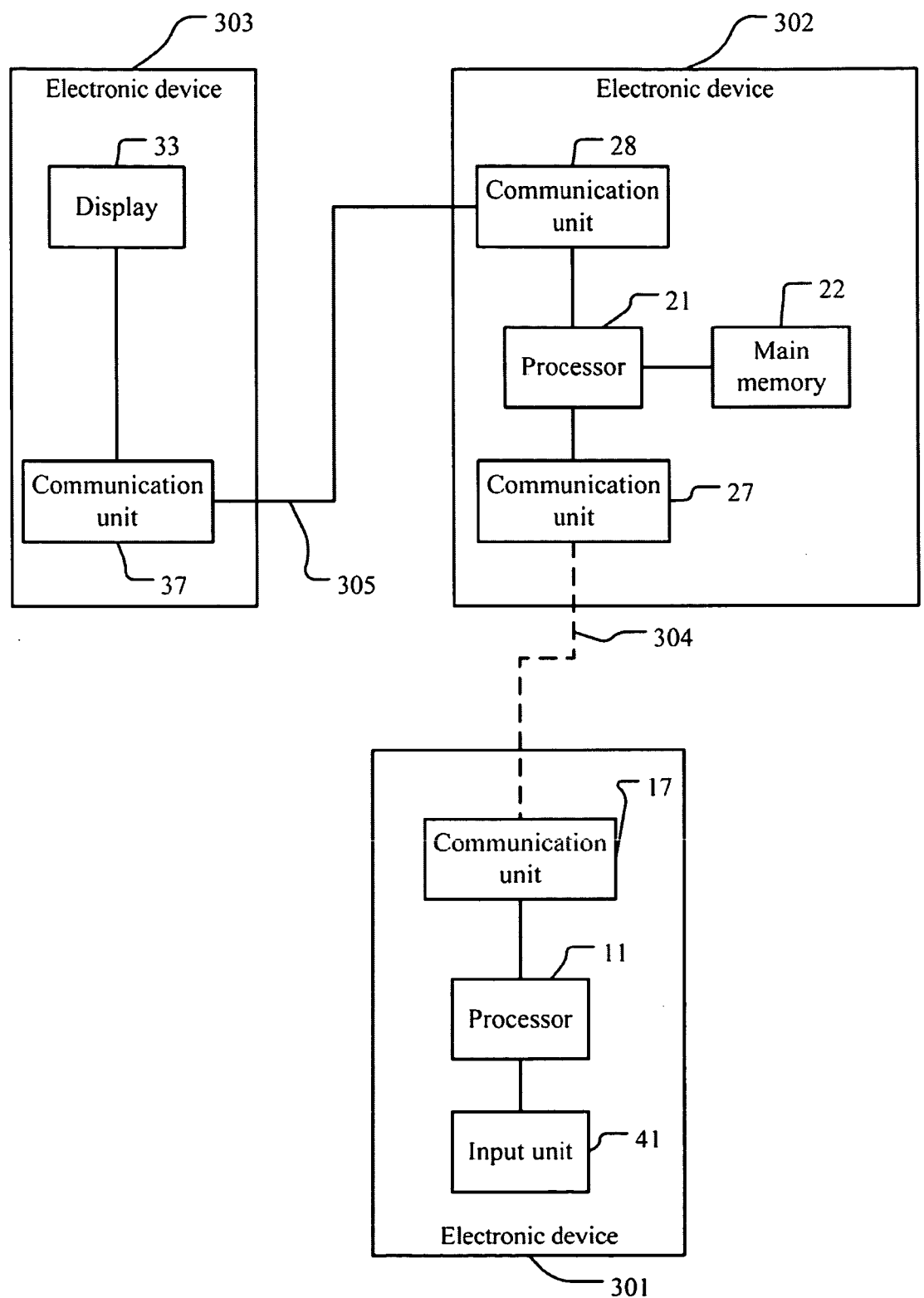
FIG. 12 is a block diagram of another embodiment of the electronic device system in which three electronic devices transfer control signals for text input and text presentation through a communication channel.

With reference to FIG. 1, an electronic device 100 comprises a processor 10, a main memory 20, a display 30, an input unit 40, and timers 50 and 60. The processor 10 may comprise various integrated circuits (ICs) for processing data and machine-readable instructions. The processor 10 may be packaged as a chip or comprise a plurality of interconnected chips. For example, the processor 10 may only comprise a central processing unit (CPU) or a combination of a CPU, a digital signal processor (DSP), and a chip of a communication controller, such as communication units in FIG. 10-12. The communication controller coordinates communication among components of the electronic device 100 or communication between the electronic device 100 and external devices. Examples of such communication controller, such as communication units in FIG. 10-12, are detailed in the paragraphs of alternative embodiments. The main memory 20 may comprise a random access memory (RAM), a nonvolatile memory, a mass storage device (such as a hard disk drive), or a combination thereof. The nonvolatile memory may comprise electrically erasable programmable read-only memory (EEPROM) and flash memory. The display 30 is configured for displaying text and image, and may comprise e-paper, a display made up of organic light emitting diode (OLED), or a liquid crystal display (LCD). The display 30 may display various graphical user interfaces including text area. The display 30 may comprise a single display or a plurality of displays in different sizes.

The input unit 40 may comprise various input devices to input data or signals to the electronic device 100, such as a touch panel, a touch screen, a keyboard, or a microphone. The timers 50 and 60 keeping predetermined time intervals may comprise circuits, machine-readable programs, or a combination thereof. Each of the timers 50 and 60 generates signals to notify expiration of the predetermined time intervals. Components of the device 100 can be connected through wirelined or wireless communication channels.

Figure 2:
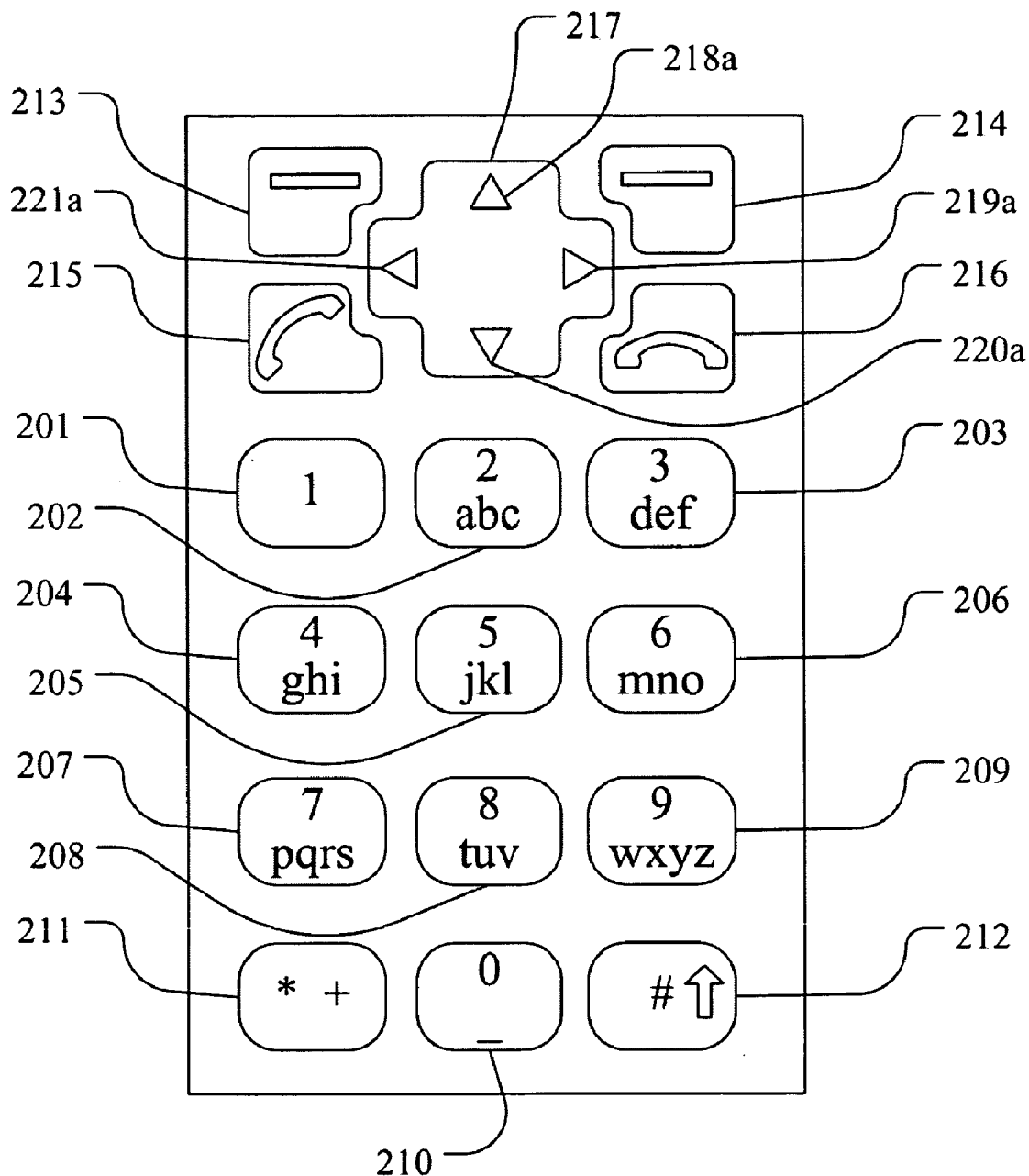
FIG. 2 is a schematic diagram of an exemplary embodiment of a keyboard.

A keyboard in FIG. 2 is an exemplary embodiment of the input unit 40. The keyboard may be made of mechanical structures or comprise a virtual keyboard shown on the display 30. The keyboard comprises keys 201-217. Keys 213 and 214 are function keys for triggering functions based on software programs executed by the electronic device 100. A key 215 is an off-hook key, and a key 216 is an on-hook key. A key 217 is configured for directing direction and movement of a cursor on the display 30. Digits, letters, and/or symbols corresponding to the keys 201-212 are shown on respective keys in FIG. 2, but are not intended to be limited thereto. Digits, characters, and/or symbols corresponding to and represented by a key may be referred to as candidates of the key. For example, the key 201 corresponds to digit "1," the key 202 corresponds to digit "2" and characters "a", "b", and "c", and the key 203 corresponds to digit "3" and characters "d", "e", and "f". The key 210 corresponds to digit "0" and a space character; the key 212 corresponds to symbol "#" and a function for switching input methods. Different input methods differ in the ways of candidate character selection. As one of different input methods can be selectively activated, each key may accordingly correspond to different sets of characters. For example, the key 212 of the electronic device 100 may activate so called abc input method or T9® text input method developed by Tegic Communications, Inc. The electronic device 100 may be installed with a plurality of character input methods that are user-selectable.

2. EXEMPLARY EMBODIMENTS OF CHARACTER INPUT METHODS

Figure 3A:
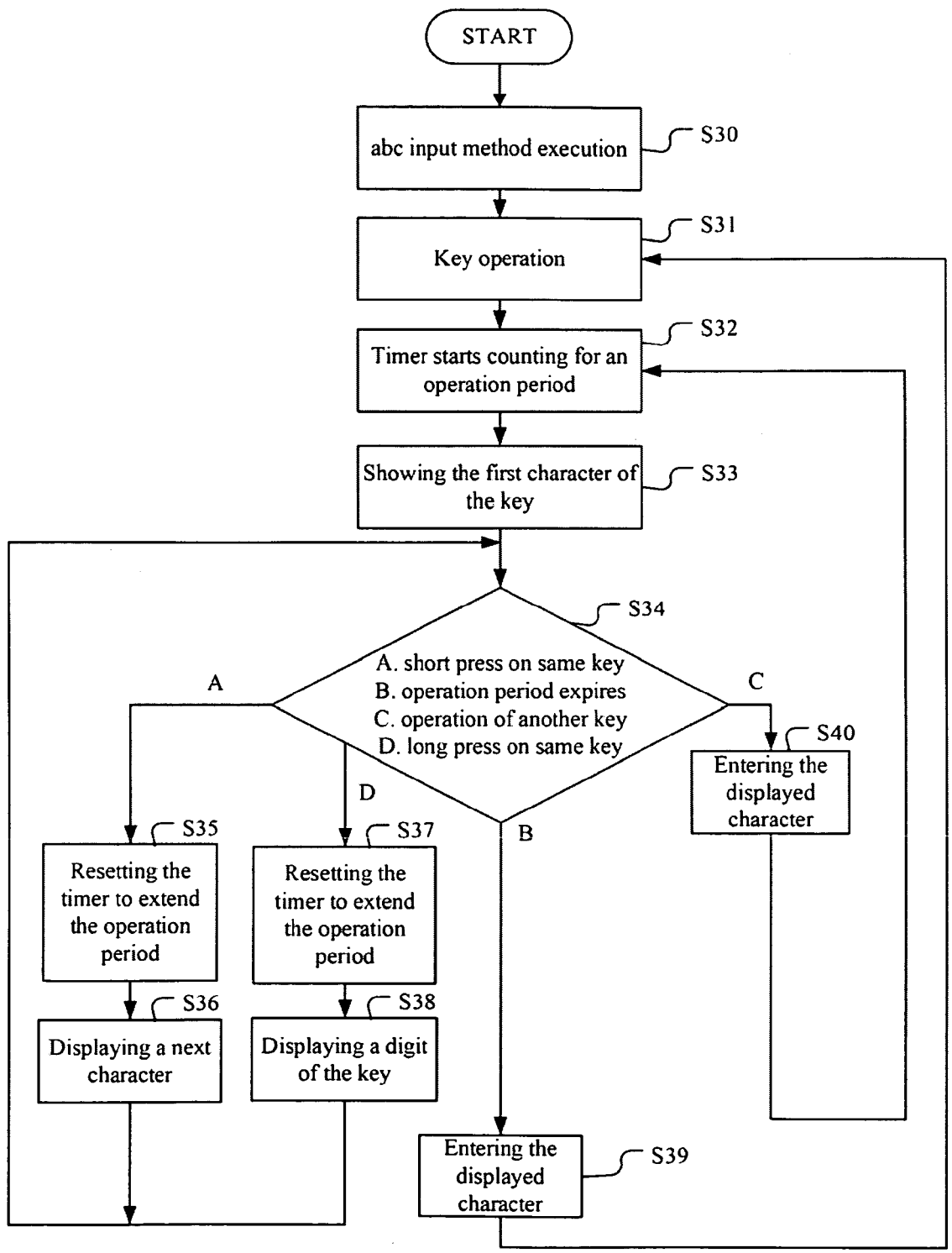
FIG. 3A is flowchart showing one embodiment of an abc input method.

FIG. 3A shows a flowchart of one embodiment of the abc input method. First, the processor 10 initializes the abc input method (step S30) and determines if any key is activated (step S31). If at least a key is activated, the processor 10 initiates a timer to keep an operation period of the activated key (step S32), and displays a first character candidate for the activated key (step S33). For example, if the key 208 is activated at the step S31, the processor 10 displays the first character candidate "t" for the activated key 208 at the step S33. In the step S34, the processor 10 continues to detect any short press on the same activated key (event A), expiration of the operation period (event B), any operation of another key (event C), or any long press on the same activated key (event D).

Upon receiving a short press on the same activated key (event A), the processor 10 resets the timer to renew counting of the operation period (step S35), and displays a next character candidate of the activated key (step S36). For example, if the key 208 is activated by a short press operation at the step S34, the processor 10 displays a next character candidate "u" for the activated key 208 at the step S36. Timer resetting can extend the operation period.

If the operation period expires (event B), the processor 10 enters a currently displayed character candidate to a text area of the display 30 of the electronic device 100 (step S39). Focusing may be applied to the currently displayed character candidate of the activated key currently displayed on the text area as a result of character candidate traversal. In one embodiment, the focusing may include enlargement of the currently displayed character, and/or displaying the currently displayed character in a bold or italic font, for example.

Upon receiving an operation of another key, referred to as a key j, where j is a integer variable (event C), the processor 10 enters the currently displayed character candidate in a text area of the electronic device 100 (step S40), returns to the step S32 to initiate an operation period of the key j, and returns to the step S33 to display a first character candidate of the key j. The processor 10 accordingly performs steps S34-S40 following the step S33 for the key j.

Upon receiving a long press operation on the same activated key (event D), the processor resets the timer (step S37) and displays a digit corresponding to the activated key (step S38). For example, if a long press operation is performed on the key 208 at the step S34, the processor 10 displays a digit "8" for the activated key 208 at the step S38.

Figure 3B:
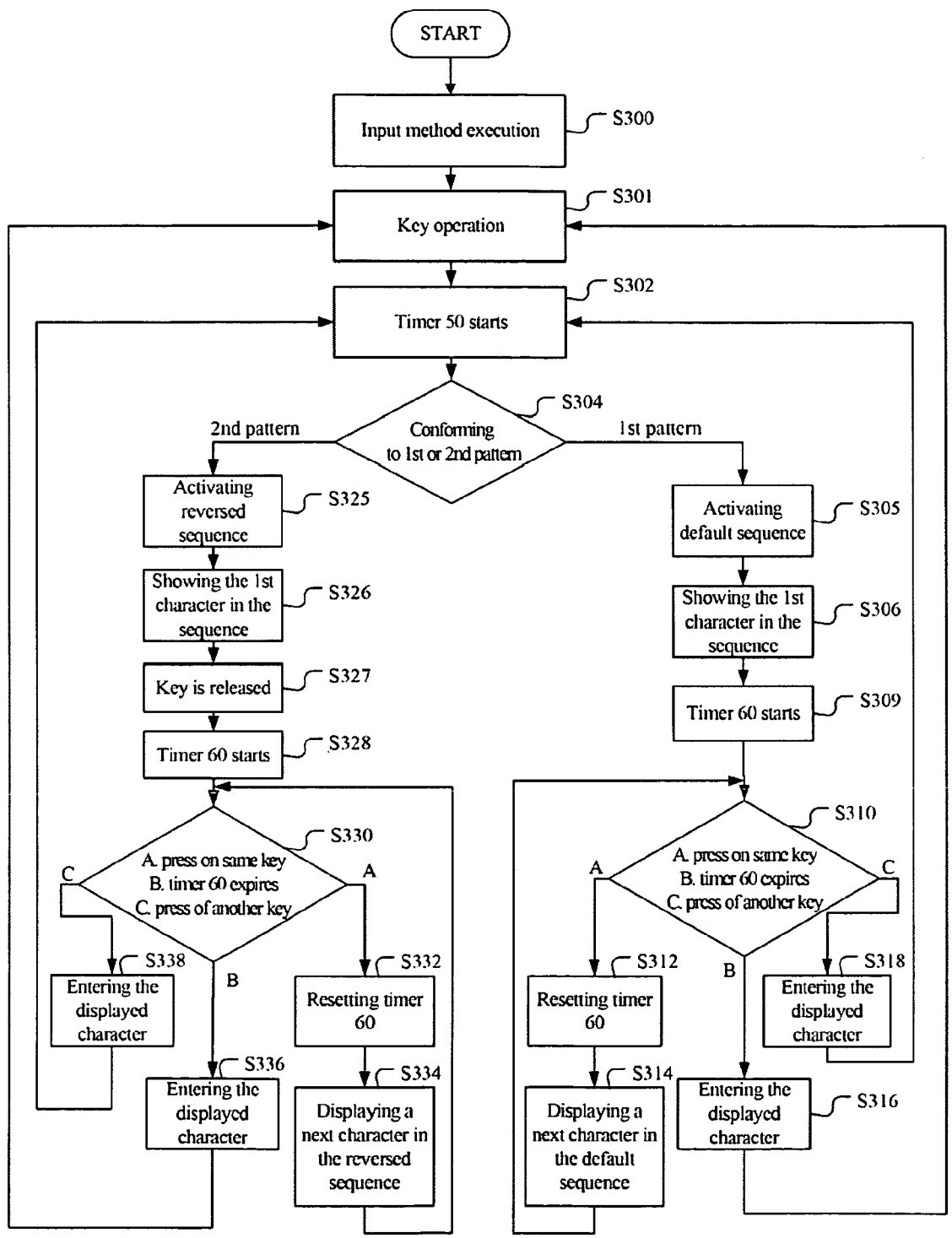
FIG. 3B is flowchart showing an exemplary embodiment of a character input method.

The electronic device 100 may be installed a plurality of character input methods and selects one of the input methods to execute. An exemplary embodiment of character input method executable by the electronic device 100 is shown in FIG. 3B. The embodiment of character input method activates different sequences of character candidates in response to different input operations on the same key without requiring switching between input methods.

2.1 First Exemplary Embodiment of Character Input Method

With reference to FIG. 3B, the processor 10 initiates a character input method (step S300) and determines if any operation is performed on a key of the input unit 40 (step S301). If an operation is performed on a key, the processor 10 initiates the timer 50 to keep a time interval for comparison with duration of the operation on the key (step S302), and determines if the operation conforms to a first input pattern or a second input pattern (step S304). The first and second input patterns may vary by electronic device design. For example, the processor 10 may identify different input operations by identifying a time interval t counted by the timer 50. For example, the processor determines that each key operation with a duration thereof less than the time interval t conforms to the first input pattern, referred to as a short press, and each key operation with a duration thereof greater than the time interval t conforms to the second input pattern, referred to as a long press. Duration of a key operation is counted from a depression of a key to releasing of the key. In other words, the processor determines that a key operation terminating before expiration of the timer 50 conforms to the first input pattern, and a key operation terminating after expiration of the timer 50 conforms to the second input pattern. The time interval t or duration of key operations may be measured in clock cycles or seconds. The time interval t may be defined as 0.5 seconds, 0.8 seconds, or 1 second, for example.

Figure 4:
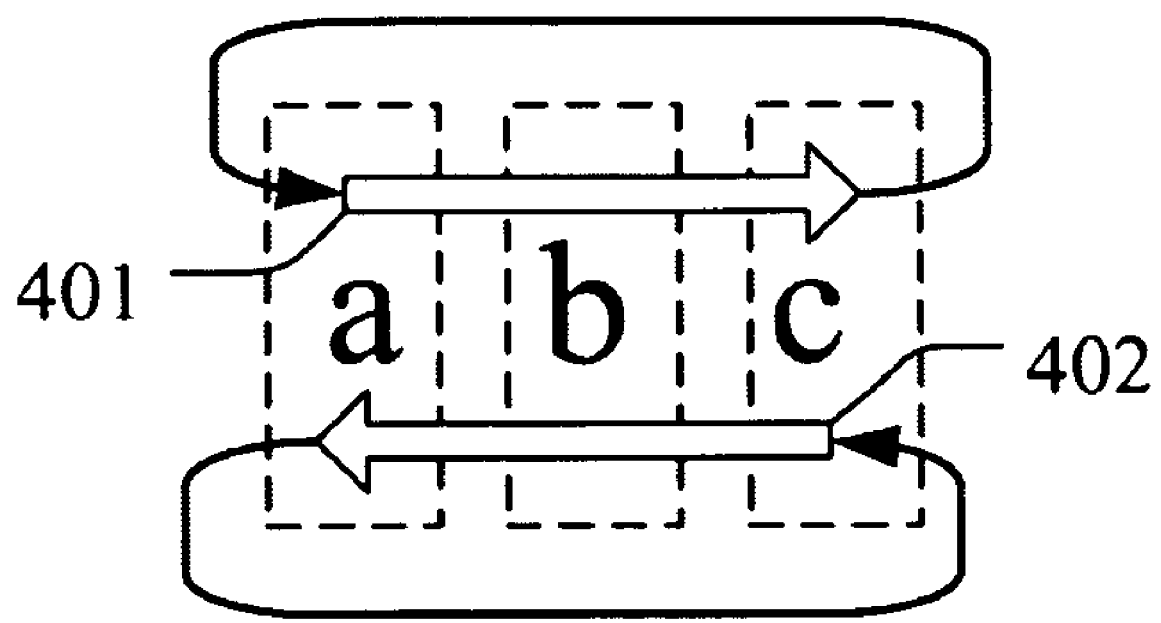
FIG. 4 shows a schematic diagram of a default direction and a reversed direction for presenting character candidates.

The key activated at step S300 is referred to as a key i, where i is a positive integer. In the example of FIG. 2, the range of i is $201 \leq i \leq 212$. If the performed operation conforms to the first input pattern, the processor 10 activates a default sequence of character candidates for the key i arranged in original order of the character candidates (step S305). That is, the processor 10 utilized the default sequence of the character candidates for the key i as a preset route for traversing the character candidates in presentation of the candidates, and displays one of the character candidates according to the preset route in response to each operation on the key j. With reference to FIGS. 2 and 4, the key 202 corresponds to digit "2" and characters "a", "b", and "c", a directed line 401 represents a route of traversing the character candidates of the key 202 in an original order, and a default sequence of the character candidates of the key 202 is "abc". The processor 10 may display one of the character candidates "a", "b", and "c" according to the route represented by line 401 in response to each operation on the key 202. The character candidate next to the "c" is "a", and the default sequence is iterated in presentation of the character candidates.

If the performed operation conforms to the second input pattern, the processor 10 activates a reversed sequence of character candidates for the key i arranged in a reversed order of the character candidates (step S325). That is, the processor 10 utilizes the reversed sequence of the character candidates for the key i as a preset route for traversing the character candidates in presentation of the candidates, and displays one of the character candidates according to the preset route in response to each operation on the key j. With reference to FIG. 4, a directed line 402 represents a route of traversing the character candidates of the key 202 in a reversed order, and a reversed sequence of the character candidates of the key 202 is "cba". The processor 10 displays one of the character candidates "c", "b", and "a" according to the route represented by line 402 in response to each operation on the key 202. The character candidate next to the "a" is "c", and the reversed sequence is iterated in presentation of the character candidates.

Similarly, the default and reversed sequences of the key 203 are respectively "def" and "fed"; the default and reversed sequences of the key 204 are respectively "ghi" and "ihg"; . . . and the default and reversed sequences of the key 209 are respectively "wxyz" and "zyxw". If the default sequence of the key 202 is "abc2" in which a digit "2" follows letter "c", the reversed sequence of the key 202 be obtained as "2cba" by reversing the default sequence, or defined by users as "cba" according to user configuration identified by the processor 10. Character candidates of each key may be stored in an appropriate data structure, such as a linked list or an array, for implementing the default and reversed character traversal and presentation. The addresses of the first and last characters may be stored in registers or the main memory 20 of the electronic device 100.

Figure 5A:
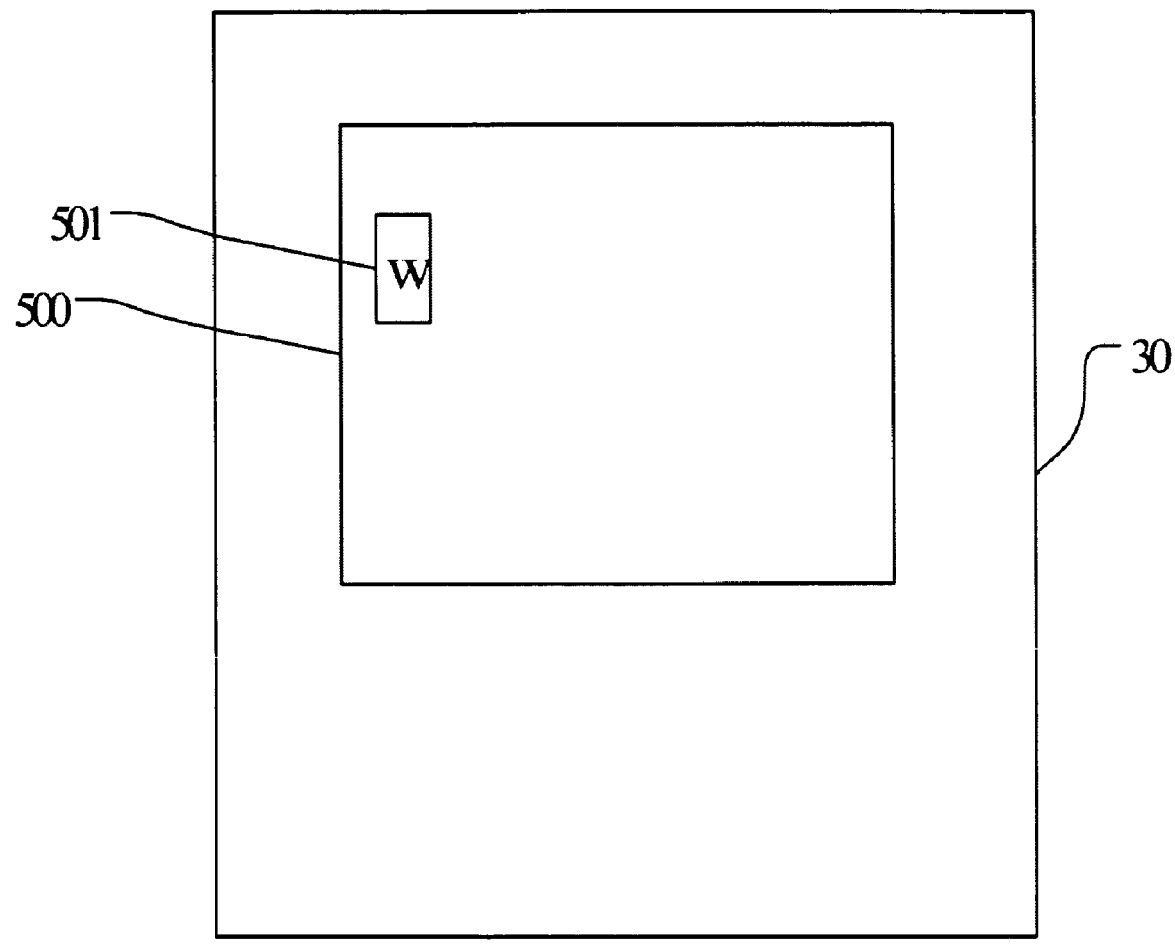
FIGS. 5A-5F are schematic diagrams showing character candidates and a cursor in a text area.

After activating the default sequence of character candidates, the processor 10 displays the first character candidate in the default sequence (step S306). For example, if the key i comprises the key 209, the processor 10 displays the first character "w" in the default sequence "wxyz" corresponding to the key 209. FIG. 5A shows a character candidate "w" indicated by a cursor 501 in a text area 500. The processor 10 initiates the timer 60 to count an operation period of the key i (step S309) and detects occurrence of any subsequent operation on the same key i (event A), expiration of the timer 60 (event B), or any operation on another key (event C) (step S310). Said another key receiving an operation in the step S310 is referred to as a key j, where j is a positive integer, $201 \leq j \leq 212$, and where and $j \neq i$.

Figure 5B:
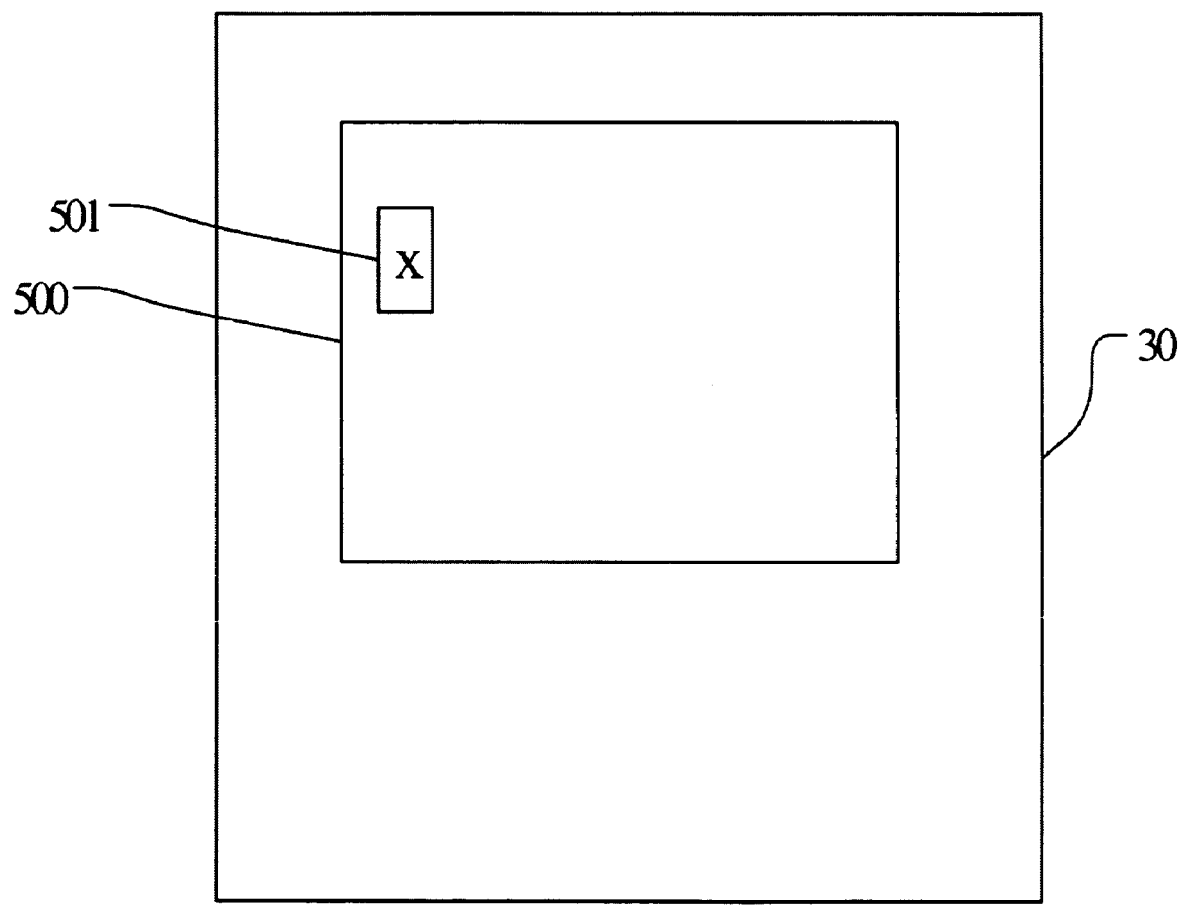

In the step S310, upon receiving a subsequent operation on the same key i (event A), the processor 10 resets the timer 60 (step S312) and displays a next character candidate in the default sequence in substitution for the currently displayed character (step S314). For example, in a case that the key i comprises the key 209, the processor 10 displays a next character candidate "x" in the default sequence "wxyz" as shown in FIG. 5B. The step S310 is repeated. Similarly, upon receiving another subsequent operation on the same key 209, the processor 10 resets the timer 60 and displays a next character candidate "y" in the default sequence "wxyz". The character candidate next to "z" in the default sequence is "w".

Figure 5C:
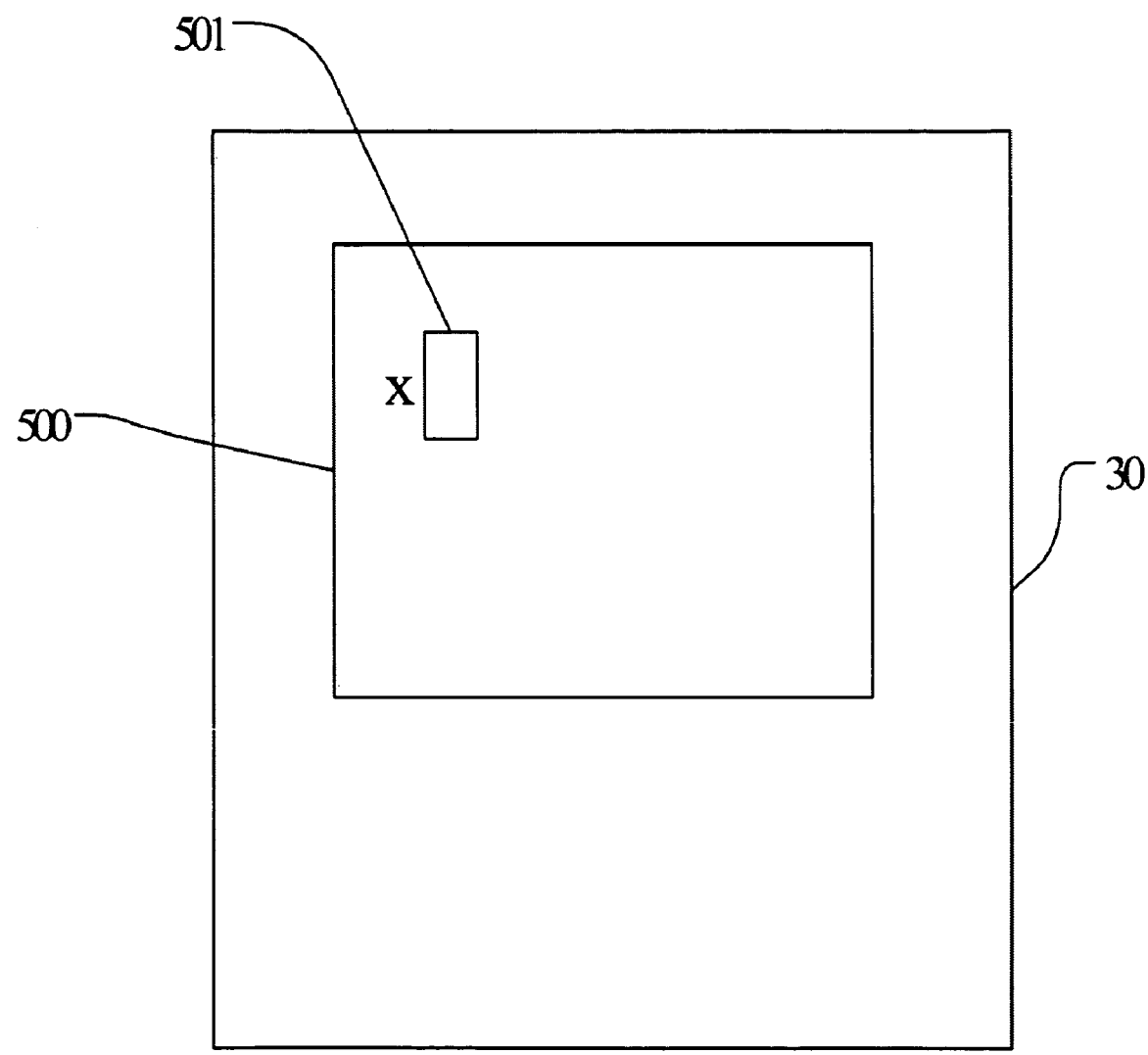

In the step S310, if the timer 60 expires (event B), the processor 10 enters a currently displayed character candidate of the key i to a text area, and moves the cursor to a next position in the text area (step S316). The step S301 is repeated. For example, if "x" is the currently displayed character candidate when the timer 60 expires, as shown in FIG. 5C, the processor 10 enters "x" to the text area 500 and moves the cursor 501 to a next position in the text area 500.

In the step S310, upon receiving an operation on another key j (event C), the processor 10 enters a currently displayed character candidate of the key i to the text area, moves the cursor to a next position in the text area (step S318), and resets the timer 60 for the key j (step S302). The processor 10 repeats steps S305-S310, S312, S314, S316, S318, S325-S328, S332, S334, S336, and S338 following the step S302, thus to present character candidates in a default or reversed sequence for the key j in response to operations on the key k.

Figure 5D:
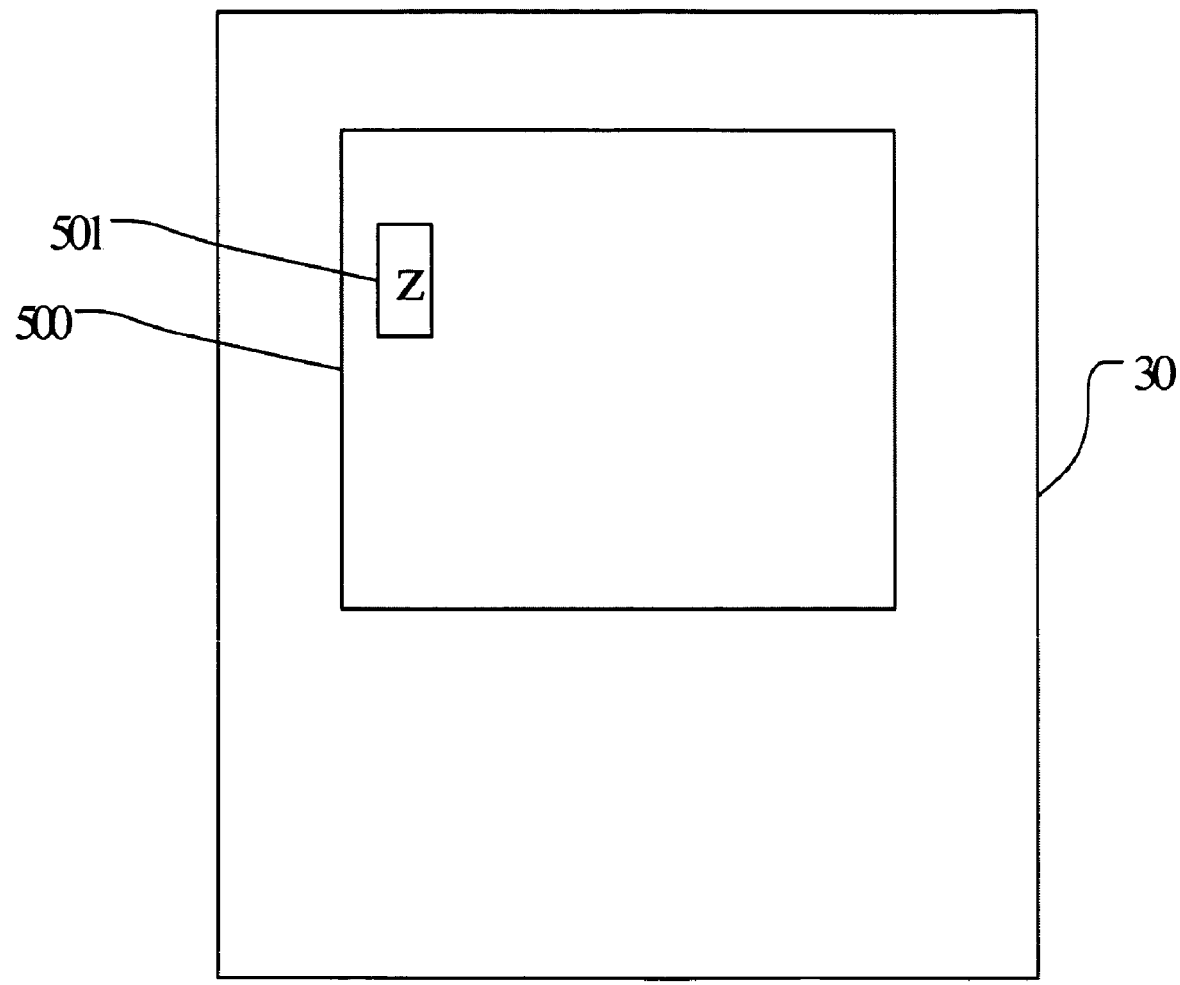

Description is now returned to a reversed sequence. In the step S325, if duration of the performed operation on the key i exceeds time interval t, the performed operation conforms to the second input pattern, and the processor 10 activates a reversed sequence of character candidates for the key i (step S325) and displays the first character candidate in the reversed sequence (step S326). For example, in a case that the key i comprises the key 209, the processor 10 displays the first character candidate "z" in the reversed sequence "zyxw", as shown in FIG. 5D, in which "z" is indicated by the cursor 501. When the performed operation on the key i is terminated (step S327), the processor 10 initiates the timer 60 to count an operation period of the key i (step S328). The processor 10 detects occurrence of any subsequent operation on the same key i (event A), expiration of the timer 60 (event B), or any operation on another key (event C) (step S330). Said another key receiving an operation in the step S330 is referred to as a key j.

Figure 5E:
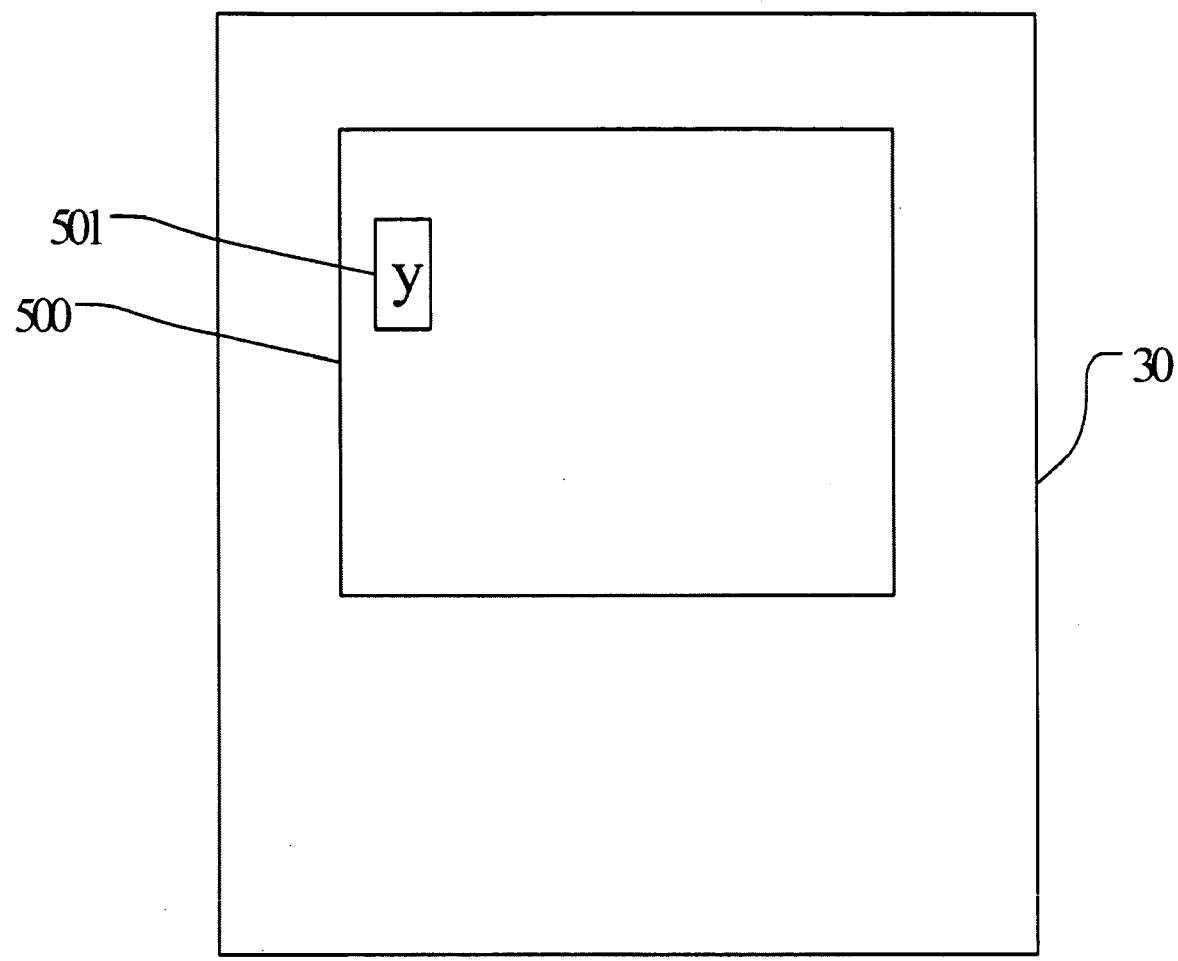

In the step S330, upon receiving a subsequent operation on the same key i (event A), the processor 10 resets the timer 60 (step S332) and displays a next character candidate in the reversed sequence in substitution for the currently displayed character (step S334). For example, in a case that the key i comprises the key 209, the processor 10 displays a next character candidate "y" in the reversed sequence "zyxw" as shown in FIG. 5E. The step S330 is repeated. Similarly, upon receiving another subsequent operation on the same key 209, the processor 10 resets the timer 60 and displays a next character candidate "x" in the reversed sequence "zyxw". The character candidate next to "w" in the reversed sequence is "z".

Figure 5F:
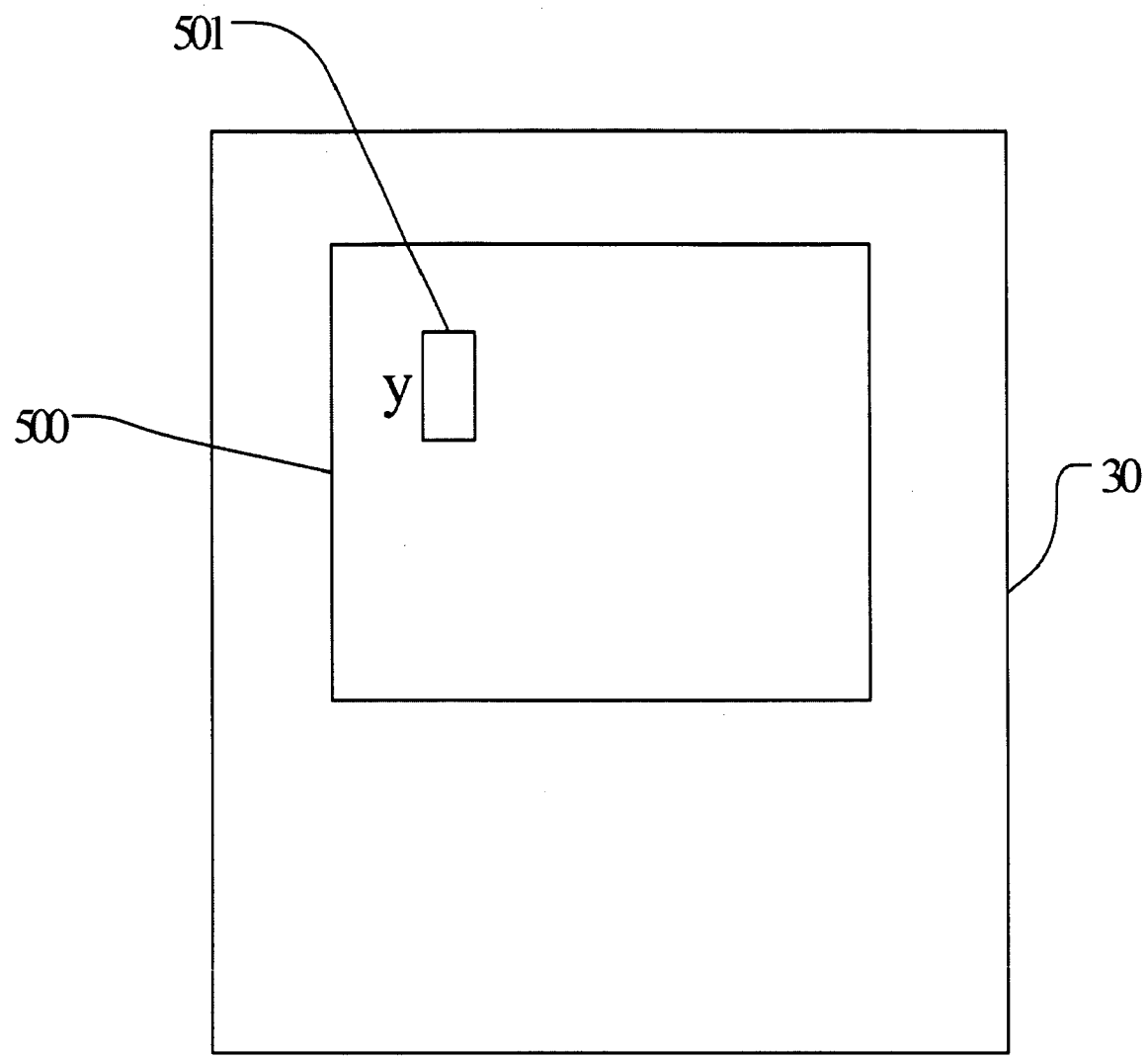

In the step S330, if the timer 60 expires (event B), the processor 10 enters a currently displayed character candidate of the key i to a text area, and moves the cursor to a next position in the text area (step S336). The step S301 is repeated. For example, if "y" is the currently displayed character candidate when the timer 60 expires, as shown in FIG. 5F, the processor 10 enters "y" to the text area 500 and moves the cursor 501 to a next position in the text area 500.

In the step S330, upon receiving an operation on another key j (event C), the processor 10 enters a currently displayed character candidate of the key i to the text area, moves the cursor to a next position in the text area (step S338), and resets the timer 60 for the key j (step S302). The processor 10 repeats steps S305-S310, S312, S314, S316, S318, S325-S328, S332, S334, S336, and S338 following the step S302 for the key j.

Note that the arrangement of steps in the input method may be changed in alternative embodiments of the input method. For example, the step S309 can be performed before the step S305 or S306. Before an operation period of a key expires, a long press on the key can change the route for traversing character candidates during the operation period. Another exemplary embodiment of the input method is given with reference to FIG. 3C.

2.2 Second Exemplary Embodiment of Character Input Method

Figure 3C:
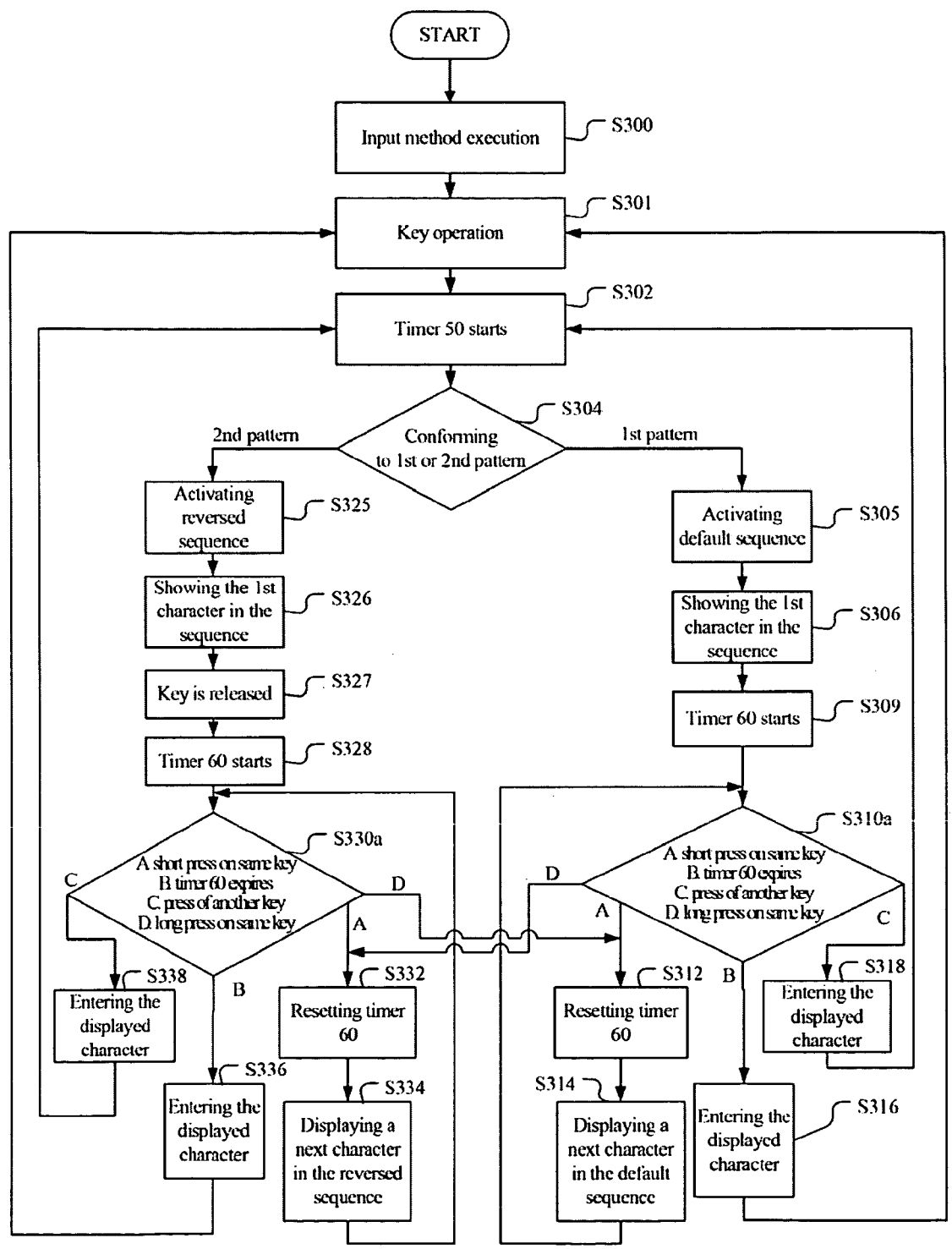
FIG. 3C is flowchart showing another embodiment of a character input method.

With reference to FIG. 3C, the difference between FIG. 3C and FIG. 3B relies on steps S310a and S330a. In the step S310a, the processor 10 detects occurrence of any subsequent short press on the same key i (event A), expiration of operation period of the key i (event B), or any operation on another key j (event C), or any long press on the key i (event D). Upon receiving a short press on the same key i (event A), the processor 10 executes the steps S312 and S314. Upon receiving a long press on the same key i (event D), the processor 10 executes the steps S332 and S334. Specifically, in the step S334, the processor 10 selects the reversed sequence as the preset route and displays a character candidate in the reversed sequence next to the currently displayed character candidate, thus to present one character candidate in the reversed sequence of the key i in response to each operation of the key i before the operation period of the key i expires. For example, in a case that the default sequence of the key 209 is initially activated as the preset route, in response to a long press in the step S310a when character "y" is currently displayed, the processor 1 displays character candidate "x" of the key 209 in step S334, which is the character candidate next to "y" in the reversed sequence of the key 209, or the character candidate previous to "y" in the default sequence of the key 209.

In the step S330a, the processor 10 detects occurrence of any subsequent short press on the same key i (event A), expiration of operation period of the key i (event B), or any operation on another key j (event C), or any long press on the key i (event D). Upon receiving a short press on the same key i (event A), the processor 10 executes the steps S332 and S334. Upon receiving a long press on the same key i (event D), the processor 10 executes the steps S312 and S314. Specifically, in the step S314, the processor 10 selects the default sequence as the preset route and displays a character candidate in the default sequence next to the currently displayed character candidate, thus to present one character candidate in the default sequence of the key i in response to each operation of the key i before the operation period of the key i expires. For example, in a case that the reversed sequence of the key 209 is initially activated as the preset route, in response to a long press in the step S330a when character "y" is currently displayed, the processor 1 displays character candidate "z" of the key 209 in step S314, which is the character candidate next to "y" in the default sequence of the key 209, or the character candidate previous to "y" in the reversed sequence of the key 209.

The exemplary embodiment of the character input method shown in FIG. 3C can repeatedly change the preset route for traversing character candidates of the key i in response to long presses on the key i before expiration of operation period of the key i. Thus, long press operations within an operation period of a key provide the function of returning to a character candidate previous to a currently displayed character candidate in character presentation. It may be understood that a long press operation within an operation period of a key may return the character presentation to a character candidate previous to a currently displayed character candidate without changing settings of the preset route. Additionally, alternative exemplary embodiments of input methods may utilize other schemes to realize presentation of character candidates in a reversed direction.

2.3 Third Exemplary Embodiment of Character Input Method

Figure 3D:
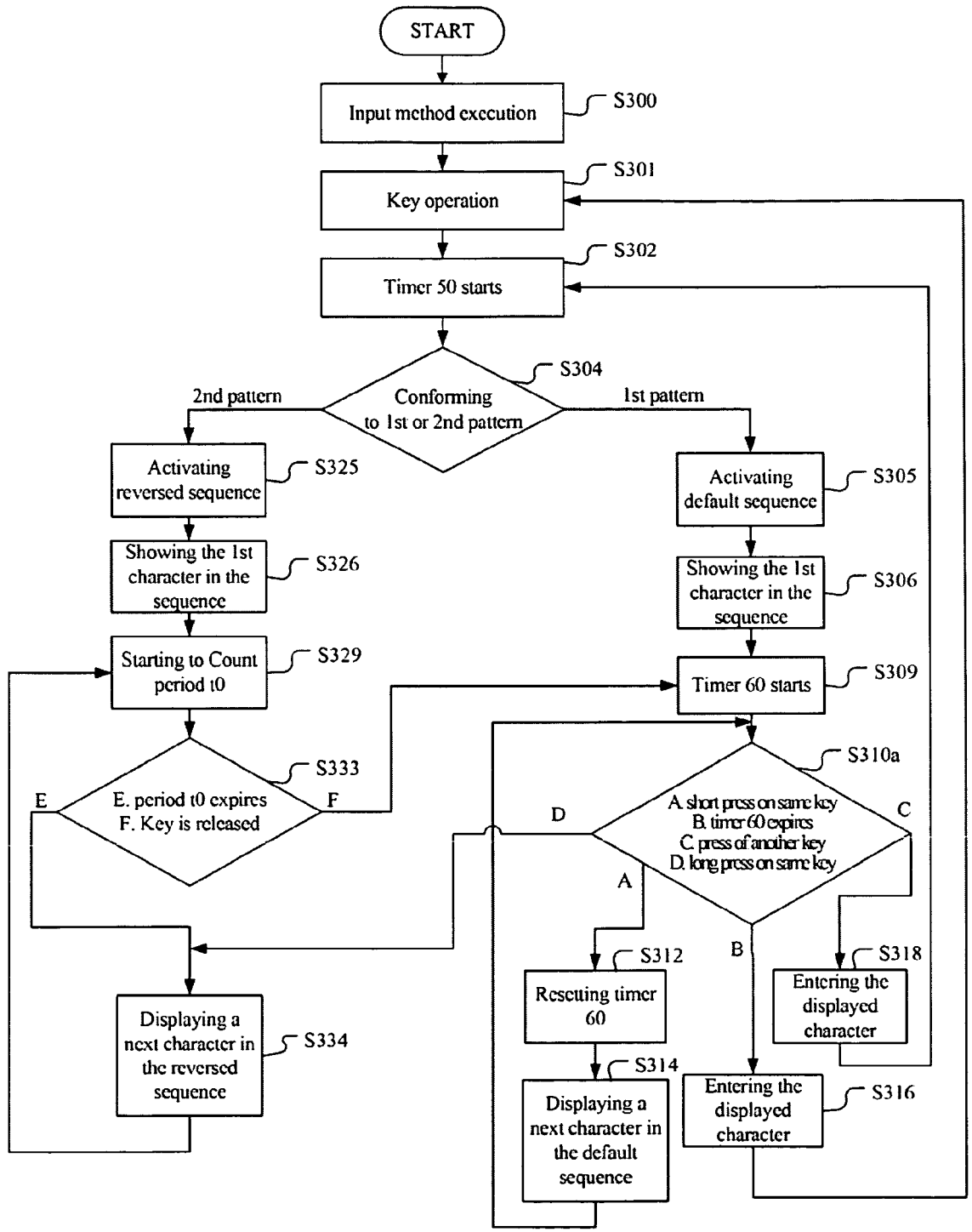
FIG. 3D is flowchart showing another embodiment of a character input method.

With reference to FIG. 3D, difference between FIG. 3D and FIG. 3B is detailed in the following.

In the step S325, if the press operation on the key i continues after the reversed sequence is activated as the preset route, the processor 10 displays the first character candidate in the reversed sequence (step S326), and begins to count an operation period t0 (step S329). The timer 50 or another timer may count the operation period t0. The processor 10 detects expiration of the operation period t0 (event E) or termination of the press operation (event F) (step S333). If the press operation on the key i continues after the operation period t0 expires (event E), the processor 10 displays a next character candidate in the reversed sequence of the key i (step S334). Subsequently, the processor 10 restarts the counting of operation period t0 (step S329) and repeats the step S333. If the press operation terminates (event F), the processor 10 executes the step S309. In the step S316 when the timer 60 expires, the processor 10 enters a currently displayed character candidate.

In the step S310a, the processor 10 detects occurrence of any subsequent short press on the same key i (event A), expiration of operation period of the key i (event B), any operation on another key j (event C), or any long press on the key i (event D). Upon receiving a short press on the same key i (event A), the processor 10 executes the steps S312 and S314. Upon receiving a long press on the same key i (event D), the processor 10 executes the step S334. Specifically, in the step S334, the processor 10 displays a character candidate in the reversed sequence next to the currently displayed character candidate, and may repeat the steps S329, S333, and S334, thus to subsequently present character candidates in the reversed sequence of the key i in response to the long press operation of the key j.

For example, the default and reversed sequences for the key 209 are respectively "wxyz" and "zyxw". In the traditional abc input method, entering "z" in an electronic device requires four press operations on the key 209, and entering "y" to a electronic device requires three press operations on the key 209. The first or second embodiment of the present character input method requires only one press operation on the key 209 to enter "z" to the electronic device 100, and two press operations on the key 209 to enter "y". Thus, the exemplary embodiments of the character input method substantially reduce the number of operations and time required to input a character, and reduce the possibility of missing a desired character during character candidate presentation.

3. VARIATION OF EMBODIMENTS

As appreciated, the time interval t is utilized to identify the first and second input patterns. More time intervals may be utilized to identify more input patterns. For example, a press operation on a key with duration less than a time interval t1 is identified as conforming to a first input pattern; a press operation on a key with a duration greater than the time interval t1 but less than a time interval t2 is identified as conforming to a second input pattern; and a press operation on a key with duration greater than the time interval t2 is identified as conforming to a third input pattern.

Figure 6:
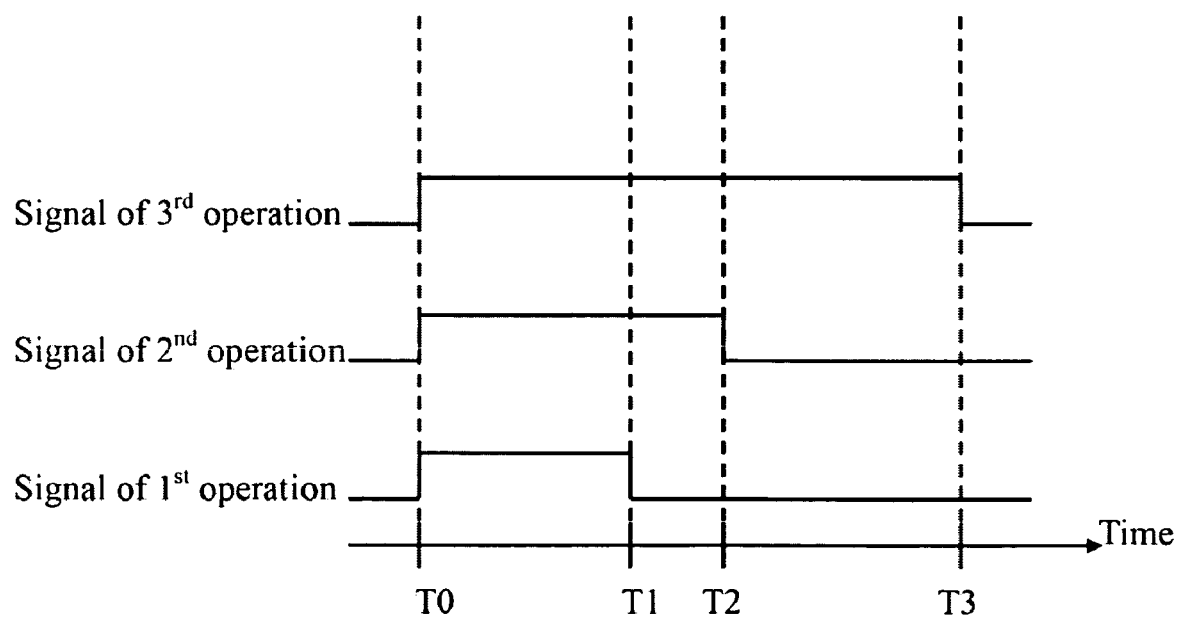
FIG. 6 is a schematic diagram showing operation signals with reference to a time line.

FIG. 6 shows a time line and signals generated from the key i during operation of the key. A high level in each signal waveform in FIG. 6 reflects a pressed state of the key i while a low level reflects a released state of the key i. Operation on the key i may generate different signal waveforms, not limited to FIG. 6. The signal of a first operation shows that the key is pressed at time T0 and released at time T1. If (T1−T0)<t1, the processor 10 determines that the first operation conforms to the first input pattern. If t1≦(T2−T0)<t2, the processor 10 determines that the second operation conforms to the second input pattern. If t2≦(T3−T0), the processor 10 determines that the third operation conforms to the third input pattern. The processor 10 may activate the reversed sequence for the key i in response to an operation conforming to the second input pattern and display a digit corresponding to the key i in response to an operation conforming to the third input pattern.

3.1 Alternative Embodiments of Character Input Method

The processor 10 may display character candidates in a menu on the display 30 to assist character input. Keys in the input unit 40 are classified as text keys and assistant keys. For example, the keys 201-212 are classified as text keys, and keys 213-217 are classified as assistant keys. The key 217 is a direction key and configured for triggering movement of a cursor to the upward, right, downward and left when activated by a press at position 218a, 219a, 220a, and 221a, respectively. The key 217 may be replaced by a five direction control means in another embodiment. Description of an alternative embodiment of an input method is given with reference to a keyboard in FIG. 9.

Figure 7:
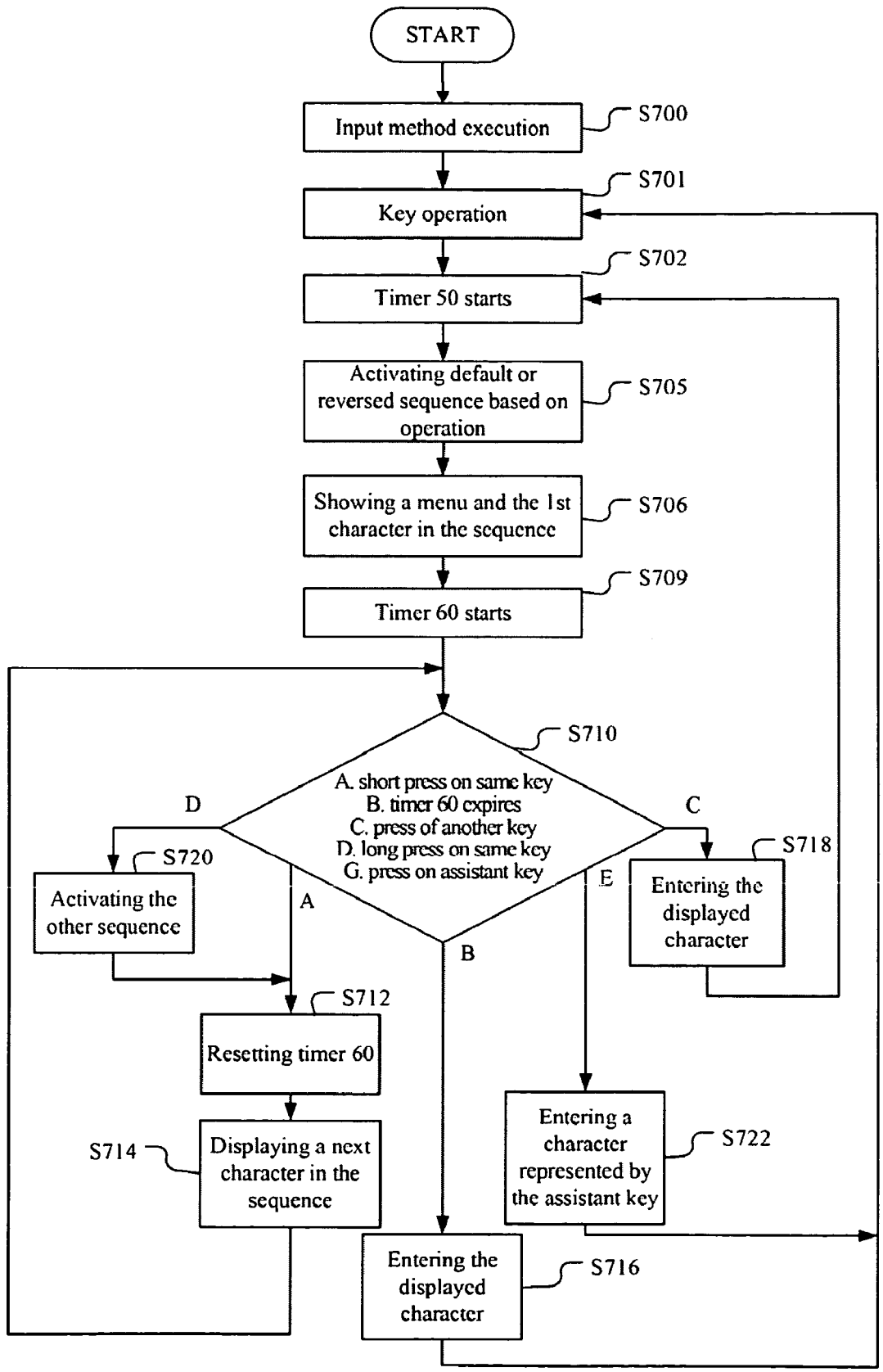
FIG. 7 is flowchart showing another embodiment of a character input method which utilizes a menu to display characters.

With reference to FIG. 7, the processor 10 initiates a character input method (step S700) and determines if a text key (referred to as the key i) in the input unit 40 is activated by an operation (step S701). Upon detecting that an operation activates a text key i, the processor 10 initiates the timer 50 to count an operation period of the key i (step S702) and activate one of the default and reversed sequence of the key i as the preset route based on whether the operation conforms to the first input pattern or the second input pattern (step S705). After the one of the default and reversed sequence is activated, the processor 10 displays a menu on the display 30 and the first character candidate in the activated sequence (step S706) and initiates the timer 60 to count an operation period of the key i (step S709).

In an example that the key i is the key 209, a menu 800 corresponding to an activated sequence of the key 209 is shown in 8A. Character candidates are arranged clockwise in the menu 800. Character candidates of a key, however, are not limited to FIG. 8A, and can be arranged counterclockwise or in any other arrangement. When the first character candidate "w" of the key 209 is shown in the text area 500, a cursor 801 indicates that "w" is a currently displayed character in the menu 800. The assistant keys 218, 219, 220, and 221 respectively correspond to character candidates "w", "x", "y", and "z".

Figure 9:
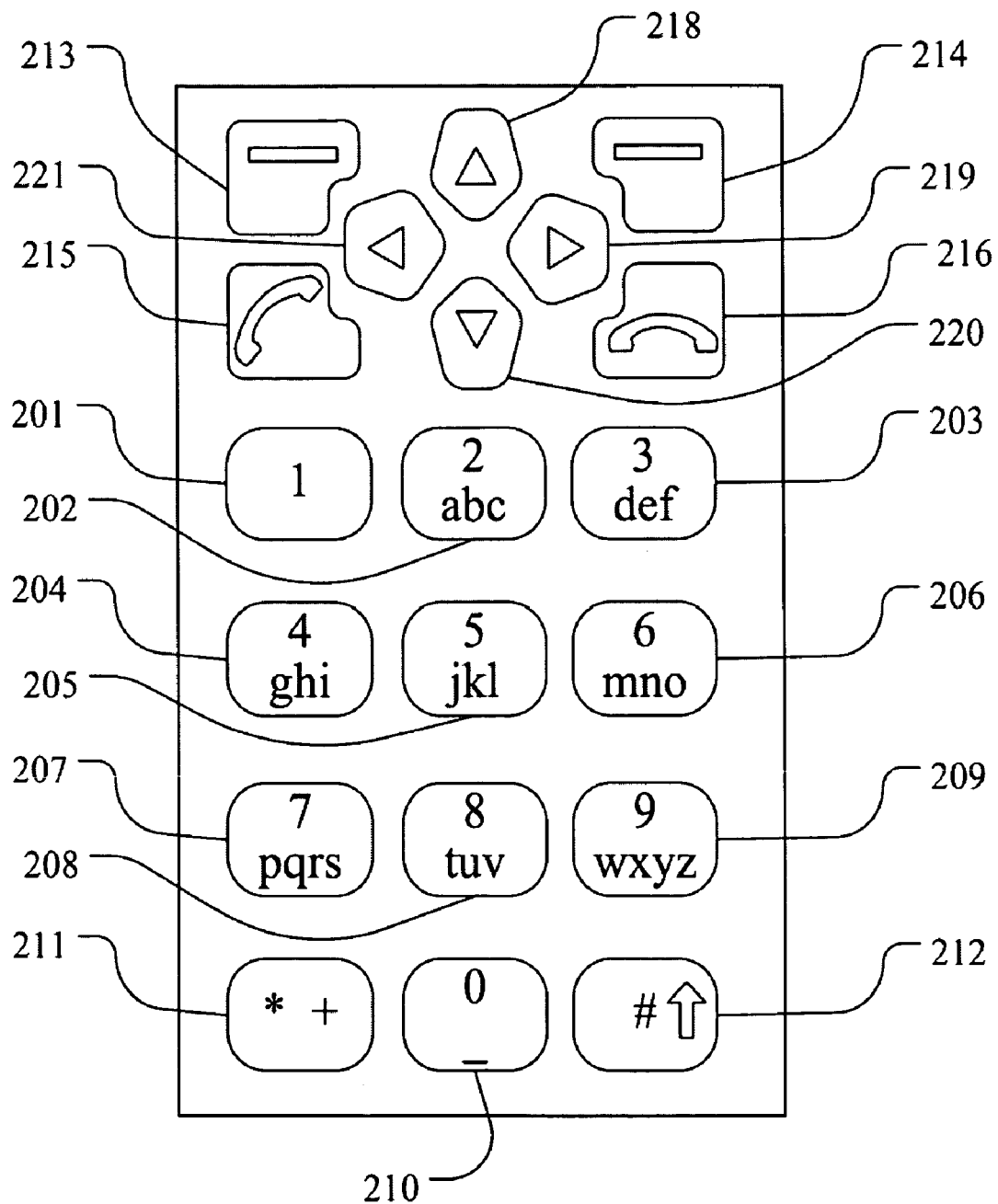
FIG. 9 is a schematic diagram of another embodiment of a keyboard.

The processor 10 detects occurrence of any subsequent short press on the same key i (event A), expiration of operation period of the key i signified by the timer 60 (event B), or any operation on another text key j (event C), or any long press on the key i (event D), or any operation on an assistant key k (event G), where k is an positive integer. In the example of FIG. 9, the range of k is 213≦k≦221.

Figure 8A:
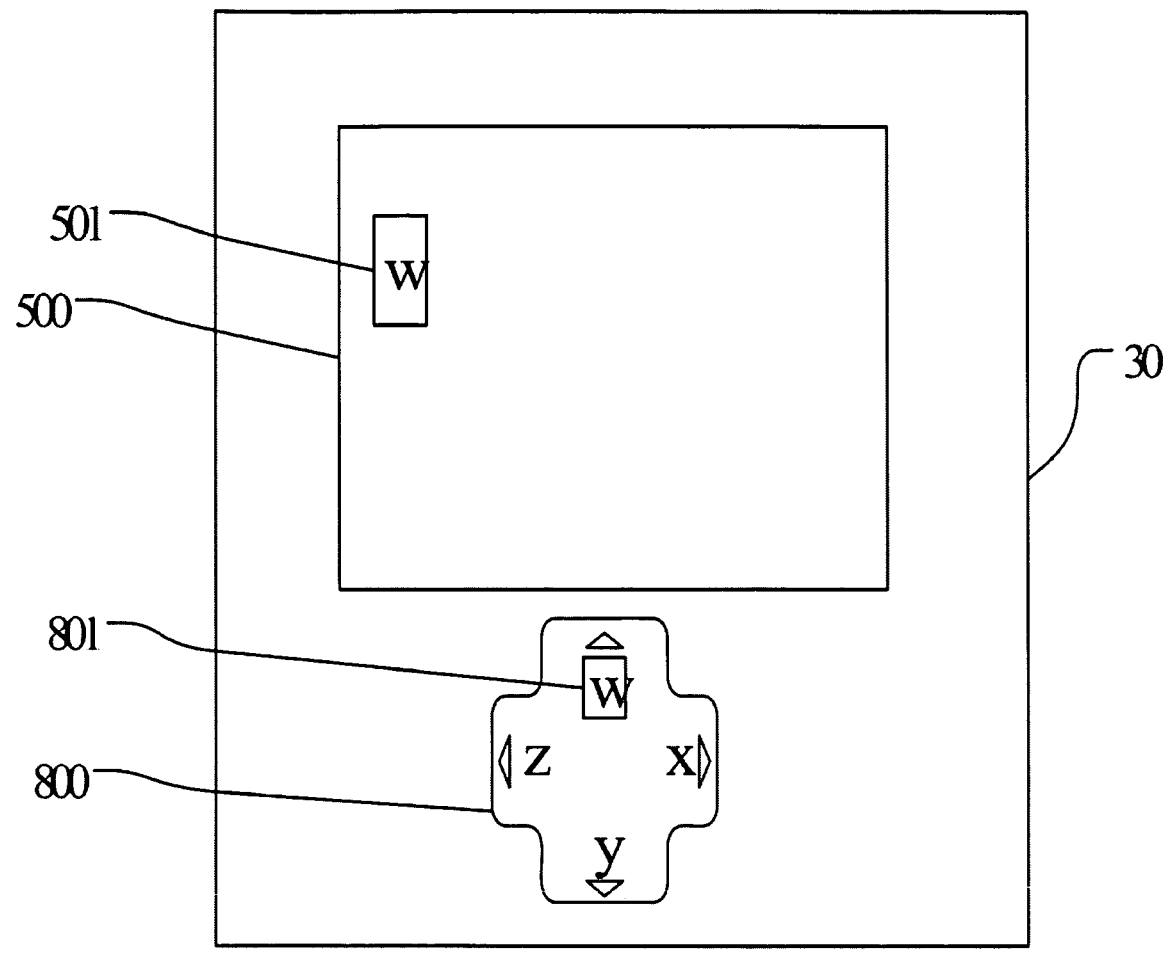
FIG. 8A is a schematic diagram showing a menu corresponding to a default sequence of character candidates "wxyz"
Figure 8B:
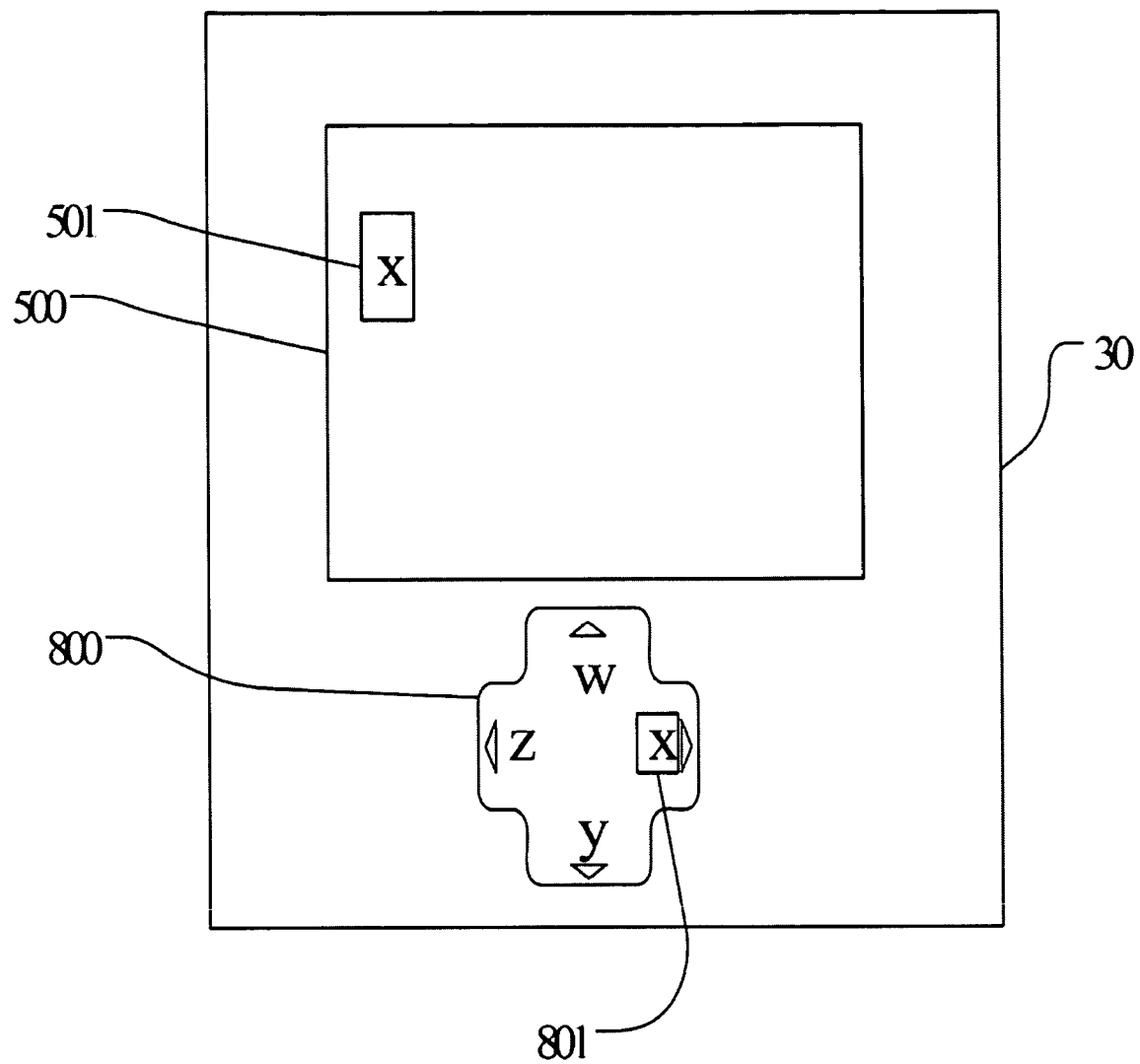
FIG. 8B is a schematic diagram of a text area in which a character "x" in the default sequence "wxyz" is displayed.

In the step S710, upon receiving a short press on the same key i (event A), the processor 10 resets the timer 60 (step S712) and displays a next character candidate in the sequence (step S714). For example, in a case that the key i comprises the key 209, following FIG. 8A, the processor 10 displays a next character candidate "x" in the default sequence "wxyz" as shown in FIG. 8B. The cursor 801 in the menu 800 also moves clockwise to the position of "x" to indicate the currently displayed character. The step S710 is repeated. Similarly, upon receiving a short press on the same key 209 (event A), the processor 10 resets the timer 60, and displays a next character candidate "y" in the default sequence "wxyz". The cursor 801 in the menu 800 also moves clockwise to the position of "y" to indicate the currently displayed character.

Figure 8C:
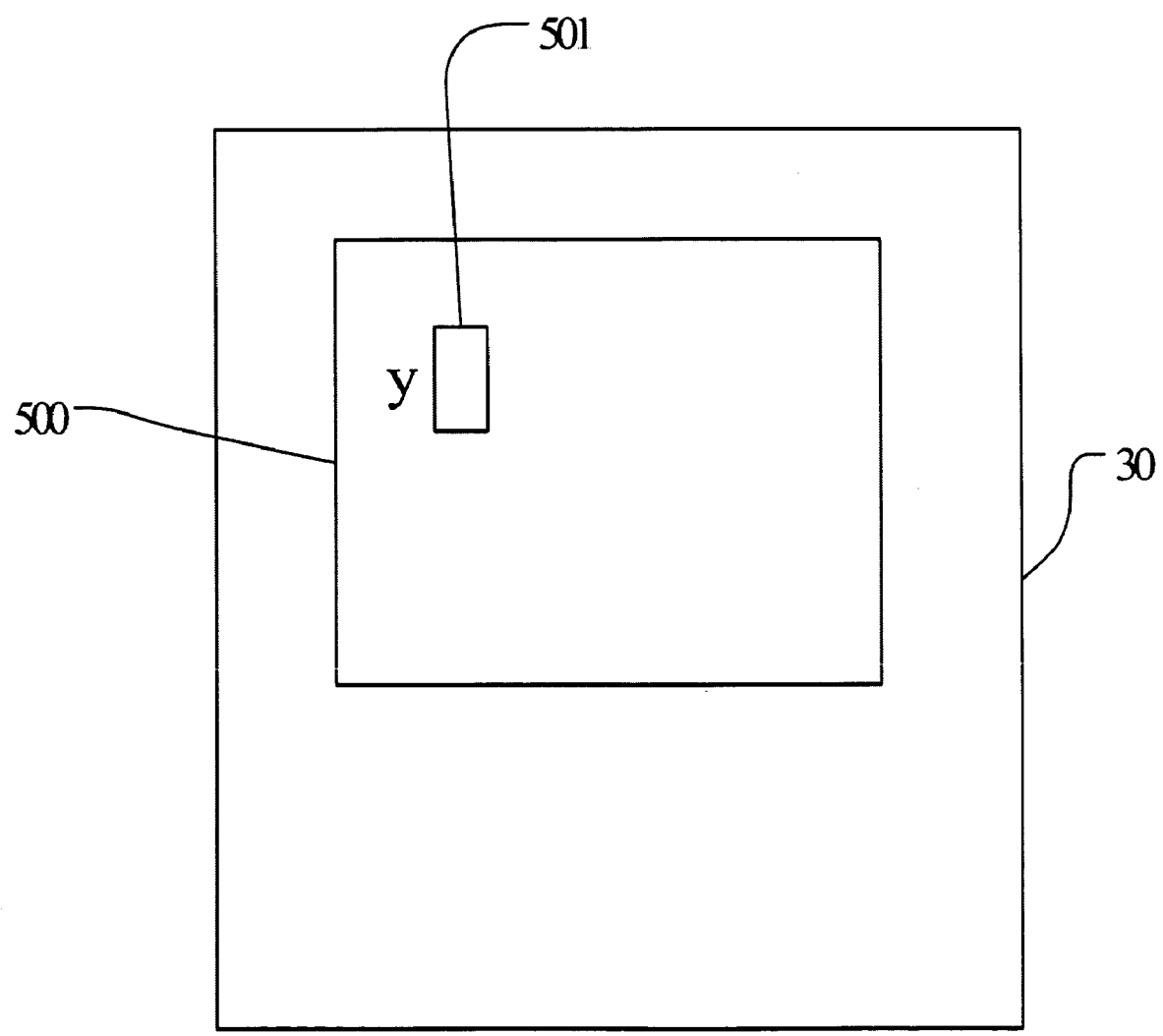
FIG. 8C is a schematic diagram of a text area into which a character "y" is entered.

In the step S710, if the timer 60 expires (event B), the processor 10 enters a currently displayed character candidate of the key i to a text area, and moves the cursor to a next position in the text area (step S716). The step S701 is repeated. For example, if "y" is the currently displayed character candidate when the timer 60 expires, as shown in FIG. 8C, the processor 10 enters "y" to the text area 500, moves the cursor 501 to a next position in the text area 500, and terminates presentation of the menu 800.

In the step S710, upon receiving an operation on another text key j (event C), the processor 10 enters a currently displayed character candidate of the key i to the text area, moves the cursor to a next position in the text area (step S718), and resets the timer 50 for the key j (step S702). The processor 10 repeats steps S705, S706, S709, S710, S712, S714, S716, S718, S720, and S722 following the step S702 for the key j.

In the step S710, upon receiving a long press on the same key i (event D), the processor 10 activate a sequence reverse to the activated sequence before the step S720. For example, if the reversed sequence of the key i is utilized as the preset route in the step S710, the processor 10 activates the default sequence of the key i as the preset route. On the other hand, if the default sequence of the key i is utilized as the preset route in the step S710, the processor 10 activates the reversed sequence of the key i as the preset route. Subsequently, in the step S714, the processor 10 displays a next character candidate in the activated sequence. In the example of FIG. 8A when the default sequence of the key 209 is activated as the preset route, upon receiving a long press on the same key 209 (event D), the processor 10 displays a character "z" previous to "w" in the default sequence "wxyz", i.e. the character candidate next to "w" in the reversed sequence, and moves the cursor 801 clockwise to the position of "z" to indicate the currently displayed character. The step S710 is repeated. Similarly, upon receiving a subsequent long press on the same key 209 (event D), the processor 10 resets the timer 60, displays a character "y" next to "z" in the reversed sequence, and moves the cursor 801 clockwise to the position of "y" to indicate the currently displayed character. FIGS. 3C and 3D shows that a long press can change the preset route of character candidates. Route for traversing character candidates, however, can be controlled by various input devices, such as a dialer, a wheel, a rotatable knob, or a touch panel. The processor 10 may perform clockwise or counterclockwise movement of the cursor 801 and the currently displayed character in response to clockwise or counterclockwise tracks detected by the touch panel. The display 30 can be equipped with a touch panel to form a touch screen. The keyboard in FIG. 9 can be a virtual keyboard displayed on the display 30.

In the step S710, upon receiving an operation on an assistant key k (event G), the processor 10 enter a character candidate corresponding to the key k to a text area, moves a cursor to a next position in the text area (step S722), and repeats steps S701, S702, S705, S706, S709, S710, S712, S714, S716, S718, S720, and S722 following the step S700. Following the example of FIG. 8A, in FIG. 8C, the processor 10 enters character "y" to the text area 500 in response to an operation on the key 220 disregarding the currently displayed. In the example of FIG. 8A, entering of character "y" to a text area requires two operations no matter in the default sequence or reversed sequence before expiration of the timer 60. With the aid of assistant keys, only one operation is required to enter the character "y" to a text area. Similarly, the processor enters character "w", "x", or "z" to the text area 500 in response to an operation on the key 218, 219, or 221. Character candidates of the key 209 can be input to electronic device 100 through the five schemes corresponding to events A, B, C, D, and G during execution of one input method with no confliction exist between these schemes.

Figure 8D:
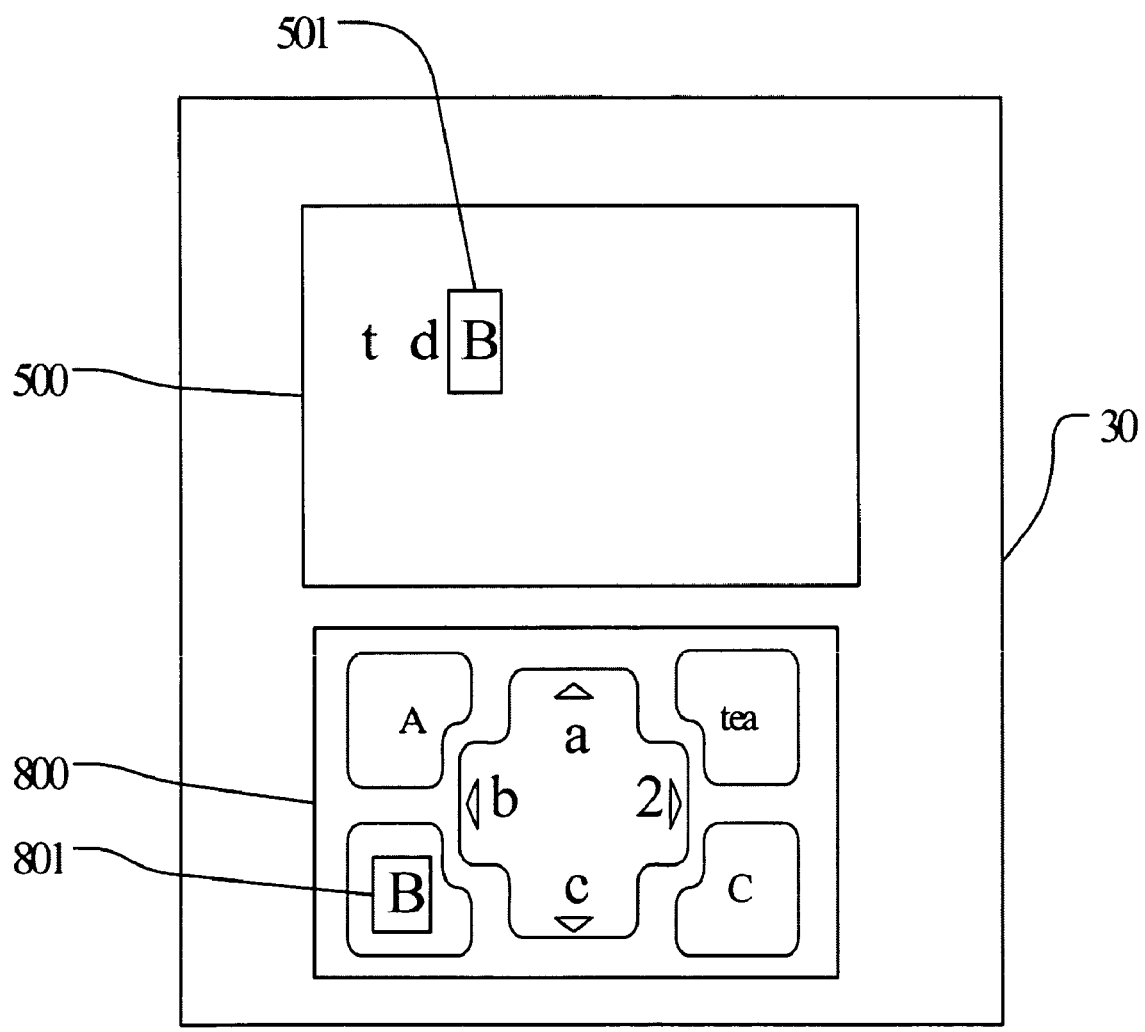
FIG. 8D is a schematic diagram showing another embodiment of a menu in which character candidates are represented by assistant keys.

The menu 800 can include more candidates for a key, such as uppercase and lowercase letters, and auto-completed words. In addition to the direction key 217, voice commands or other keys can be utilized to represent character candidates in the menu 800. As shown in FIG. 8D, when the key 202 receives an operation, assistant keys 213, 214, 215, 216, 218, 219, 220, and 221 respectively represent "A", "tea", "B", "C", "a", "2", "c", and "b". The "tea" is an auto-completed word, which is determined by the processor 10 from input characters in front of the cursor 501 in the text area 500 and character candidates in the menu 800. For example, characters in front of the cursor 501 comprise "t" and "d". Character candidates of the key 208 associated with the character "t" are "t", "u", and "v". Character candidates of the key 203 associated with the character "d" are "d", "e", and "f". The processor 10 selects the first letter in the auto-completed word from "t", "u", or "v", the second letter in the auto-completed word from "d", "e", and "f", and the last letter in the auto-completed word from the menu 800. The processor 10 may select an auto-completed word according to those words, which are most frequently input by users of the electronic device 100, or based on a dictionary database in the electronic device 100. The auto-completed word in the menu 800 may be generated according to T9® input method.

3.2 Alternative Embodiments of the Electronic Device

The exemplary embodiments of the character input method can be executed in various systems, such as electronic device systems shown in FIG. 10-12.

In FIG. 10, a processor 11 of an electronic device 101 executes the character candidates input method, and a communication unit 17 transmits text to a communication unit 27 through communication channel 104. A processor 21 displays the text received by the communication unit 27 on a display 32 and enters the text into a text area of an electronic device 102. The communication channel 14 in FIG. 10 may transfer text message and control signals between the electronic devices 101 and 102.

In FIG. 11, a communication unit 17 of an electronic device 201 transmits input signals generated by an input unit 41 to communication unit 27 through communication channel 204. A processor 21 in the electronic device 202 displays character candidates on a display 32 and enters the character candidates to a text area under the direction of the character input method based on input signals received by the communication unit 27. The electronic device 202 may display the text on an external display.

In FIG. 12, a communication unit 17 of an electronic device 301 transmits input signals generated by an input unit 41 to communication unit 27 through communication channel 304. A processor 21 in the electronic device 202 performs the character input method based on input signals received by the communication unit 27 and transmits generated characters to a communication unit 28. The communication unit 28 transmits the characters to a communication unit 37 through a communication channel 305. An electronic device 303 characters the text received by the communication unit 37 on a display 33.

The communication channels 104, 204, 304, and 305 may be wire-lined or wireless channels. Each of the electronic devices 101, 201, and 301 may be a remote control or portable device, such as a PDA, an ultra mobile device (UMD), a laptop computer, or a cell phone. Each of the electronic devices 102, 202, and 303 may comprise a television or a media player, such as a disc player. The electronic device 302 may comprise a set-top box. The main memory 2 and 22 in FIGS. 10-12 may store computer-readable program for implementing the character input method.

4. CONCLUSION

The described embodiments of the character input method can be utilized to input characters of various languages, such as Hiragana and Katakana of Japanese, or phonetic symbols of Chinese. Other means such as highlighted color or size, rather than a cursor as described, can be utilized to indicate a currently display character candidate.

In conclusion, the character input method activates default or reversed sequence of character candidates in response to different operations on the same key and utilizes a menu to assist character input. The character input method reduces the number of operations and time required for character input, and thus eliminates the possibility of mis-operation. The character input method is adoptable with and not conflicting with the traditional abc input method. Execution of the character input method does not restrict device user to learn new input schemes but provides to device user options of character input with less keystrokes.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device system, comprising:
   an input unit comprising a plurality of keys which comprise physical keys with mechanical structures or electronically displayable virtual keys, wherein each key of the plurality of keys is operable as a toggle key and is associated with a sequence of character candidates which comprises optional characters arranged in a specific arrangement for character input to the electronic device system, and two different keys in the plurality of keys are respectively associated with different sequences of character candidates, and the plurality of keys comprise a first key; and
   a processor electronically connected to the input unit and electronically connectable to a display, the processor operable to detect operation of a key of the input unit according to a method of character presentation on the display, the method comprising:

detecting if a first operation on a first key of the plurality of keys conforms to a first input pattern;

utilizing a first route of character presentation to traverse a plurality of optional characters associated with the first key to present a first character of the plurality of optional characters associated with the first key on the display as a currently selected character in response to the first operation conforming to the first input pattern and a first subsequent character of the plurality of optional characters on the display as the currently selected character in response to a first subsequent operation based on the first key according to the first route upon the condition that the first operation conforms to the first input pattern;

detecting if the first operation conforms to a second input pattern; and utilizing a second route of character presentation other than the first route to traverse the plurality of optional characters associated with the first key to present a second character of the plurality of the optional characters associated with the first key on the display as the currently selected character in response to the first operation conforming to the second input pattern and a second subsequent character of the plurality of optional characters associated with the first key on the display as the currently selected character in response to a second subsequent operation based on the first key according to the second route upon the condition that the first operation conforms to the second input pattern wherein the second character is different from the first character, arrangement of at least two optional characters in the first route is reversed in the second route, the second and the currently selected character is presented during character presentation associated with the first key and is selected to be input to a text area of the electronic device system upon the end of character presentation associated with the first key.

2. The electronic device system as claimed in claim 1, wherein the first subsequent character is presented as the currently selected character on the display upon a condition that the first subsequent operation is received during an operation period of the character presentation associated with the first key, and the second subsequent character is presented as the currently selected character on the display upon a condition that the second subsequent operation is received during an operation period of character presentation associated with the first key.

3. The electronic device system as claimed in claim 1, wherein the processor presents one of the plurality of the optional characters associated with the first key on the display for an operation period in response to the first operation, and if the operation period expires during presentation of a specific character of the plurality of the optional characters, the processor enters the specific character to the text area of the display of the electronic device.

4. The electronic device system as claimed in claim 3, wherein the processor displays a first priority optional character of the first key in the first route on the display if the first operation initiating the operation period conforms to the first input pattern, and wherein the processor displays a first priority optional character of the first key in the second route on the display if the first operation initiating the operation period conforms to the second input pattern, and wherein the first priority optional character of the first key in the second route is a last priority optional character of the first key in the first route.

5. The electronic device system as claimed in claim 3, wherein during utilization of the first route as a preset route of character presentation of the first key, the processor changes the preset route of character presentation of the first key by utilizing the second route of character presentation as the preset route to traverse a plurality of optional characters associated with the first key to present the plurality of optional characters, in response to a second operation on the first key following the first operation upon a condition that the second operation conforms to the second input pattern.

6. The electronic device system as claimed in claim 3, wherein if a second operation conforming to the second input pattern is performed based on the first key after initiation of the operation period during presentation of an n-th optional character associated with the first key, the processor presents on the display an optional character which is next to the n-th optional character in the second route, and previous to the n-th optional character in the first route in response to the second operation.

7. The electronic device system as claimed in claim 1, wherein the processor presents a menu comprising the currently selected character and the plurality of the optional characters associated with the first key on the display, and wherein when each of the plurality of the optional characters in the menu is represented by an assistant key other than the first key, and the processor enters a specific character of the plurality of the optional characters in the menu to the text area of the electronic device system on the display upon activation of an assistant key representing the specific character.

8. The electronic device system as claimed in claim 7, wherein assistant keys representing the plurality of the optional characters in the menu do not belong to the plurality of keys in the input unit each key of which is associated with a sequence of character candidates.

9. The electronic device system as claimed in claim 1, wherein the electronic device system comprises a set-top box or a cell phone.

10. The electronic device system as claimed in claim 1, wherein the input unit comprises a touch panel, at least one of the first subsequent operation and the second subsequent operation comprises a touch track detectable by the touch panel for triggering the presenting of the first subsequent character as the currently selected character, the touch track comprises an operation based on the first key and comprises a first touch track and a second touch track.

11. The electronic device system as claimed in claim 10, wherein the first operation conforming to the first input pattern comprises a short press on the first key, duration of the short press is less than a predetermined time interval, the first operation conforming to the second input pattern comprises a long press on the first key, duration of the long press is greater than the predetermined time interval, and the first touch track and the second touch track based on the first key do not conflict with the first operation on the first key such that release of the first key is not necessarily required between the first operation and the first touch track or between the first operation and the second touch track.

12. The electronic device system as claimed in claim 11, the processor maintains presentation of the menu on the display to show visual relationship between sequential selection of at least two characters in the menu in turn as the currently selected character and directions of the first touch track and the second touch track.

13. The electronic device system as claimed in claim 10, wherein the first touch track and the second touch track respectively comprise touch movements in different directions.

14. The electronic device system as claimed in claim 10, wherein the first touch track and the second touch track respectively comprise clockwise and counterclockwise touch movements on the touch panel, the menu comprises a left character and a right character on the right side of the left character, and the method further comprises:

if the left character is currently presented as the currently selected character, the processor selects the right character as the currently selected character in substitution for the left character in response to the first touch track, wherein the selecting of the right character as the currently selected character by the first touch track does not require the first touch track detectable by the touch panel to move into an area representing the right character on the display; and if the right character is currently presented as the currently selected character, the processor selects the left character as the currently selected character in substitution for the right character in response to the second touch track, wherein the selecting of the left character as the currently selected character by the second touch track does not require the second touch track detectable by the touch panel to move into an area representing the left character on the display.

15. The electronic device system as claimed in claim 1, wherein the plurality of the optional characters associated with the first key comprise at least three optional characters.

16. The electronic device system as claimed in claim 1, wherein the method further comprises:

presenting a third subsequent character of the plurality of optional characters on the display as the currently selected character in response to a third subsequent operation based on the first key according to the first route upon the condition that the first operation conforms to the first input pattern; and presenting a fourth subsequent character of the plurality of optional characters associated with the first key on the display as the currently selected character in response to a fourth subsequent operation based on the first key according to the second route upon the condition that the first operation conforms to the second input pattern.

17. The electronic device system as claimed in claim 16, wherein the first subsequent operation and the second subsequent operation respectively conform to the first input pattern.

18. The electronic device system as claimed in claim 1, wherein each key of the plurality of keys is operable to be toggled between a pressed state and a released state, the plurality of keys are arranged as a mechanical keyboard with mechanical structure or a electronically displayable virtual keyboard, and the first key is switchable between the pressed state and the released state and is not transitioned to a specialized state beyond toggling of the first key between the pressed state and the released state in response to any or all of the first operation, the first subsequent operation, and the second subsequent operation.

19. The electronic device system as claimed in claim 1, wherein the first input pattern represents a default input scheme of short press on the first key operable to select one optional character associated with the first key as the currently selected character according to the first route of character presentation, wherein duration of the short press is less than a predetermined time interval, and the second input pattern represents an alternative input scheme of long press on the first key operable to select one optional character associated with the first key as the currently selected character according to the second route of character presentation, wherein duration of the long press is greater than the predetermined time interval.

20. The electronic device system as claimed in claim 1, wherein the first subsequent operation comprises a first subsequent press on the first key or a first touch track based on the first key detectable by a touch sensitive device of the input unit, and the second subsequent operation comprises a second subsequent press on the first key or a second touch track based on the first key detectable by a touch sensitive device of the input unit.

21. The electronic device system as claimed in claim 20, wherein the input unit comprises the display and is operable as a touch screen, the plurality of keys comprise virtual keys displayed on the touch screen, the menu is displayed on the touch screen, the first touch track is not required to enter an area representing the menu to reach a position representing the first subsequent character in the menu for the presenting of the first subsequent character as the currently selected character, and the second touch track is not required to enter an area representing the menu to reach a position representing the second subsequent character in the menu for the presenting of the second subsequent character as the currently selected character.

22. The electronic device system as claimed in claim 21, wherein a direction of a movement of the currently selected character on the menu from the first character to the first subsequent character is associated with a movement direction of the first touch track, and a direction of a movement of the currently selected character on the menu from the second character to the second subsequent character is associated with a movement direction of the second touch track.

23. The electronic device system as claimed in claim 20, wherein the first touch track and the second touch track based on the first key detectable by the input unit are performed during an operation period of the first key for input of the currently selected character to the electronic device system.

24. The electronic device system as claimed in claim 1, wherein the currently selected character is shown on a position in the text input area of the electronic device system where the currently selected character is to be entered.

25. The electronic device system as claimed in claim 1, wherein the method further comprises:

extending an operation period of the first key for input of the currently selected character to the electronic device system in response to each subsequent operation based on the first key before expiration of the operation period.

26. The electronic device system as claimed in claim 1, wherein the plurality of character candidates in the menu comprise letters associated with the first key in lowercase and uppercase.

27. The electronic device system as claimed in claim 1, wherein the menu comprise at least one candidate of auto-completed words derived from at least one character associated with the first key.

28. An electronic device system, comprising:

an input unit comprising a plurality of keys which comprise physical keys with mechanical structures or electronically displayable virtual keys, wherein each key of the plurality of keys is operable as a toggle key and is associated with a sequence of character candidates which comprises optional characters arranged in a specific arrangement for character input to the electronic device system, and two different keys in the plurality of keys are respectively associated with different sequences of character candidates, and the plurality of keys comprise a first key; and a processor electronically connected to the input unit and electronically connectable to a display, and operable to detect operation of a key of the input unit according to a character input method, the method comprising:

presenting a first character of a plurality of optional characters in a first sequence of character candidates associated with the first key as a currently selected character on the display in response to a first operation of the first key conforming to a first input pattern;

determining if a second operation based on the first key during the presentation of the first character conforms to a second input pattern;

presenting an optional character associated with the first key previous to the first character on the display as the currently selected character with respect to a preset order of character presentation of the first sequence if the second operation conforms to the second input pattern; and presenting another optional character associated with the first key next to the first character on the display as the currently selected character with respect to the preset order of character presentation of the first sequence if the second operation does not conform to the second input pattern;

wherein the first sequence comprises three or more optional characters associated with first key, the first operation comprises an operation initiating presentation of optional characters associated with the first key or an operation received by the input device during character presentation associated with the first key, wherein the preset order of character presentation represents a pre-determined arrangement of the plurality of optional characters associated with the first key, and the currently selected character is selected to be input to a text area of the electronic device system upon completion of character presentation associated with the first key.

29. The electronic device system as claimed in claim 28, wherein the first input pattern is different from the second input pattern, and the processor determines if the second operation conforms to the second input pattern based on a duration of the second operation.

30. The electronic device system as claimed in claim 29, wherein the processor presents one of the plurality of the optional characters corresponding to the first key in the display for a pre-determined operation period in response to each operation of the first key, and if the pre-determined operation period expires during presentation of a specific character of the plurality of the optional characters, the processor enters the specific character to a text area of the display.

31. The electronic device system as claimed in claim 29, wherein the first input pattern represents a default input scheme of short press on the first key operable to select one optional character associated with the first key as the currently selected character according to the preset order of character presentation, wherein duration of the short press is less than a predetermined time interval, and the second input pattern represents an alternative input scheme of long press on the first key operable to select one optional character associated with the first key as the currently selected character, wherein duration of the long press is greater than the predetermined time interval.

32. The electronic device system as claimed in claim 31, wherein the processor presents an optional character of the first key next to the first character with respect to the preset order of character presentation if the second operation conforms to the first input pattern.

33. The electronic device system as claimed in claim 28, wherein the electronic device system comprises a set-top box or a cell phone.

34. The electronic device system as claimed in claim 28, wherein the input unit comprises a touch panel, the second operation comprises a touch track detectable by the touch panel, and the character input method further comprises:

presenting an optional character of the first key next to the first character with respect to the preset order of character presentation if the second operation does not conform to the second input pattern but does conform to a third input pattern of the first key;

wherein the second operation when conforming to the second input pattern or the third input pattern respectively comprises a touch track detectable by the touch panel moving in a first direction or in a second direction;

wherein the selecting of the currently selected character by the touch track does not require the touch track detectable by the touch panel to move into an area representing the currently selected character on the display.

35. The electronic device system as claimed in claim 34, wherein the input unit comprises a touch screen on which the first key is displayed as a virtual key.

36. The electronic device system as claimed in claim 34, wherein the method further comprises:

presenting a menu comprising the currently selected character and the plurality of the optional characters associated with the first key on the display, and wherein the processor maintains presentation of at least two characters in the menu in turn as the currently selected character to show visual relationship between progress of selection of the currently selected character on the menu and directions of the touch track comprised in the second operation detectable by the touch panel.

37. The electronic device system as claimed in claim 36, wherein the second operation when conforming to the second input pattern comprise a first touch track on the touch panel in clockwise or counterclockwise touch movement, and the second operation when conforming to the third input pattern comprise a second touch track on the touch panel in clockwise or counterclockwise touch movement contrary to the first touch track, the menu comprises a prior character and a posterior character associated with the first key according to the present order of character presentation, and the method further comprises:

if the prior character is currently presented as the currently selected character, the processor selects the posterior character as the currently selected character in substitution for the prior character in response to the second touch track, the selecting of the posterior character as the currently selected character by the second touch track does not require the second touch track detectable by the touch panel to move into an area representing the posterior character on the display; and if the posterior character is currently presented as the currently selected character, the processor selects the prior character as the currently selected character in substitution for the posterior character in response to the first touch track, wherein the selecting of the prior character as the currently selected character by the first touch track does not require the first touch track detectable by the touch panel to move into an area representing the prior character on the display.

38. The electronic device system as claimed in claim 36, wherein the plurality of character candidates in the menu comprise letters associated with the first key in lowercase and uppercase.

39. The electronic device system as claimed in claim 36, wherein the menu comprise at least one candidate of auto-completed words derived from at least one character associated with the first key.

40. The electronic device system as claimed in claim 28, wherein the first operation conforming to the first input pattern comprises a short press on the first key, duration of the short press is less than a predetermined time interval, the first operation conforming to the second input pattern comprises a long press on the first key, duration of the long press is greater than the predetermined time interval, and the first touch track and the second touch track based on the first key do not conflict with the first operation on the first key such that release of the first key is not necessarily required between the first operation and the first touch track or between the first operation and the second touch track.

41. The electronic device system as claimed in claim 28, wherein the first key is associated with character candidates of alphabetical letters.

42. The electronic device system as claimed in claim 28, wherein each key of the plurality of keys is operable to be toggled between a pressed state and a released state, the plurality of keys are arranged as a mechanical keyboard with mechanical structure or a electronically displayable virtual keyboard, and the first key is switchable between the pressed state and the released state and is not transitioned to a specialized state beyond toggling of the first key between the pressed state and the released state in response to any or both of the first operation and the second operation.

43. The electronic device system as claimed in claim 28, wherein the second operation comprises a subsequent press on the first key or a first touch track based on the first key detectable by the input unit.

44. The electronic device system as claimed in claim 28, wherein the currently selected character is shown on a position in the text input area of the electronic device system where the currently selected character is to be entered.

45. The electronic device system as claimed in claim 28, wherein the method further comprises:
  extending an operation period of character presentation associated with the first key for input of the currently selected character to the electronic device system in response to each subsequent operation based on the first key.

46. An electronic device system, comprising:
  an input unit comprising a plurality of keys which comprise physical keys with mechanical structures or electronically displayable virtual keys, wherein each key of the plurality of keys is operable as a toggle key and is associated with a sequence of character candidates which comprises optional characters arranged in a specific arrangement for character input to the electronic device system, and two different keys in the plurality of keys are respectively associated with different sequences of character candidates, the input unit further comprises a second input device, and the plurality of keys comprise a first key; and
  a processor electronically connected the input unit and operable to present character information on a display when connected to the display, and operable to detect operation of a key of the input unit according to a character input method, the method comprising:
  presenting a menu on the display and a first character of a plurality of optional characters associated with the first key as a currently selected character in a text area of the display for an operation period of character presentation associated with the first key in response to a first operation based on the first key, wherein the menu comprises the plurality of optional characters associated with the first key, the second input device of the input unit other than the first key represents a second character associated with the first key in the menu;
  presenting a first subsequent character as the currently selected character in the text area in substitution for the first character according to a predetermined order of the plurality of optional characters associated with the first key in response to another subsequent character operation based on the first key subsequent to the first operation upon a condition that the subsequent character operation is detected by the electronic device system before expiration of the operation period, wherein the predetermined order represents a predetermined arrangement of the plurality of optional characters associated with the first key, and the first subsequent character comprises a character next to the first character in the predetermined arrangement of the plurality of optional characters associated with the first key;
  entering the currently selected character of the first key which is currently presented on the text area into the text area upon expiration of the operation period of the first key; and
  entering the second character represented by the second input device into the text area disregarding the currently selected character currently presented on the text area if an operation on the second input device is detected before expiration of the operation period.

47. The electronic device system as claimed in claim 46, wherein a second key in the input unit controls movement and moving direction of a cursor of the electronic device system, and the operation of the second input device is an operation on the second key.

48. The electronic device system as claimed in claim 47, wherein the plurality of optional characters associated with the first key is arranged clockwise or counterclockwise in the menu according to the predetermined arrangement, and each operating position of the second input device represents a character of the plurality of optional characters.

49. The electronic device system as claimed in claim 46, wherein the second input device comprises a touch sensitive device that receives the operation of the second input device.

50. The electronic device system as claimed in claim 49, wherein the processor renders presentation of a character in the menu which is identical to the currently selected character in the text area distinctive in character presentation style from other characters in the menu, and selects one of the plurality of optional characters associated with the first key from the menu as the currently selected character according to clockwise or counterclockwise movement detected by the touch sensitive device.

51. The electronic device system as claimed in claim 49, wherein the touch sensitive device comprises a touch screen, and the plurality of keys of the input unit comprises virtual keys displayed on the touch screen.

52. The electronic device system as claimed in claim 50, wherein the presentation style comprises color or size for presenting a character in the menu.

53. The electronic device system as claimed in claim 52, wherein the processor selects the first subsequent character in the menu other than the first character as the currently selected character according to a first route of character presentation to traverse the plurality of optional characters in response to a first touch track on the touch sensitive device, and selects another second subsequent character in the menu other than the first character as the currently selected character according to a second route of character presentation to traverse the plurality of optional characters in response to a second touch track on the touch sensitive device.

54. The electronic device system as claimed in claim 53, wherein the first operation of press conforming to the first input pattern comprises a short press on the first key, duration of the short press is less than a predetermined time interval, the first operation of press conforming to the second input pattern comprises a long press on the first key, duration of the long press is greater than the predetermined time interval, and the first touch track based on the first key does not conflict with the long press on the first key such that release of the first key is not necessarily required between the long press and the first touch track.

55. The electronic device system as claimed in claim 53, wherein at least two optional characters in the first route is reversed in the second route.

56. The electronic device system as claimed in claim 53, wherein the method further comprises:
if the first operation conforms to a first input pattern, the processor associated the first key with a first sequence of character candidates and utilizes the first sequence of character candidates as a currently selected sequence to provide character candidates in the first sequence as the plurality of optional characters associated with the first key; and
if the first operation conforms to a second input pattern, the processor associated the first key with a second sequence of character candidates different from the first sequence and utilizes the second sequence of character candidates as the currently selected sequence to provide character candidates in the second sequence as the plurality of optional characters associated with the first key.

57. The electronic device system as claimed in claim 56, wherein at least two optional characters in the first sequence is reversed in the second sequence.

58. The electronic device system as claimed in claim 56, wherein the number of character candidates in the first sequence is different from the number of character candidates in the second sequence.

59. The electronic device system as claimed in claim 56, wherein each of the first sequence and the second sequence comprises at least three optional characters.

60. The electronic device system as claimed in claim 56, wherein a first priority character candidate arranged as the first character candidate in the first sequence comprises the last character candidate in the second sequence, and a first priority character candidate arranged as the first character candidate in the second sequence comprises the last character candidate in the first sequence.

61. The electronic device system as claimed in claim 56, wherein the plurality of optional characters associated with the first key comprise at least two classes of characters, which comprise a class of numerical characters and a class of alphabetical characters, and the first sequence and the second sequence respectively comprise different classes of characters.

62. The electronic device system as claimed in claim 56, wherein the first operation initiates the operation period of the first key, if the first key is associated with one of the first sequence and the second sequence as the currently selected sequence, the processor performs switching of the currently selected sequence by associating the other one of the first sequence and the second sequence with the first key as the currently selected sequence in response to a second operation on the first key conforming to the second input pattern before the end of the operation period of the first key.

63. The electronic device system as claimed in claim 62, wherein after associating the other one of the first sequence and the second sequence with the first key as the currently selected sequence, the processor selects a third character in the currently selected sequence next to the first character as the currently selected character in substitution for the first character, wherein the third character comprises a character prior to the first character in the selected sequence before the switching.

64. The electronic device system as claimed in claim 56, wherein each key of the plurality of keys is operable to be toggled between a pressed state and a released state, the plurality of keys are arranged as a mechanical keyboard with mechanical structure or a electronically displayable virtual keyboard, and the first key is switchable between the pressed state and the released state and is not transitioned to a specialized state beyond toggling of the first key between the pressed state and the released state in response to the first operation conforming to the first input pattern or the second input pattern.

65. The electronic device system as claimed in claim 56, wherein the first input pattern represents a default input scheme of short press on the first key operable to select one optional character associated with the first key as the currently selected character according to the first route of character presentation, wherein duration of the short press is less than a predetermined time interval, and the second input pattern represents an alternative input scheme of long press on the first key operable to select one optional character associated with the first key as the currently selected character according to the second route of character presentation, wherein duration of the long press is greater than the predetermined time interval.

66. The electronic device system as claimed in claim 52, wherein the first touch track and the second touch track respectively comprise touch movements in different directions.

67. The electronic device system as claimed in claim 66, wherein the processor maintains presentation of the menu to show visual relationship between sequential selection of at least two characters in the menu in turn as the currently selected character and directions of the first touch track and the second touch track.

68. The electronic device system as claimed in claim 67, wherein the plurality of optional characters associated with the first key is arranged clockwise or counterclockwise in the menu according to the predetermined arrangement.

69. The electronic device system as claimed in claim 67, wherein the first touch track and the second touch track respectively comprise clockwise and counterclockwise touch movements on the touch sensitive device, the menu comprises a left character and a right character on the right side of the left character, and if the left character is currently presented as the currently selected character, the method further comprises:
selecting the right character as the currently selected character in substitution for the left character in response to the first touch track, wherein the selecting of the right character as the currently selected character by the first touch track does not require the first touch track detectable by the touch sensitive device to move into an area representing the right character on the display; and
if the right character is currently presented as the currently selected character, the method further comprises:
selecting the left character as the currently selected character in substitution for the right character in response to the second touch track, wherein the selecting of the left character as the currently selected character by the second touch track does not require the second touch track detectable by the touch sensitive device to move into an area representing the left character on the display.

70. The electronic device system as claimed in claim 46, wherein the electronic device system comprises a set-top box or a cell phone.

71. The electronic device system as claimed in claim 46, wherein the subsequent character operation comprises a subsequent press on the first key or a first touch track detectable by a touch sensitive device based on the first key, and the input unit comprises the touch sensitive device.

72. The electronic device system as claimed in claim 71, wherein the input unit comprises the display and is operable as a touch screen, the plurality of keys comprise virtual keys displayed on the touch screen, the menu is displayed on the touch screen, and selection of first subsequent character as the currently selected character by the first touch track does not require the first touch track to enter an area of the menu to reach a position of the first subsequent character in the menu.

73. The electronic device system as claimed in claim 72, wherein a direction of a movement of the currently selected character on the menu from the first character to the first subsequent character is associated with a direction of the first touch track.

74. The electronic device system as claimed in claim 71, wherein the first touch track based on the first key detectable by the input unit is performed during an operation period of character presentation associated with the first key for input of the currently selected character to the electronic device system.

75. The electronic device system as claimed in claim 46, wherein the currently selected character is shown on a position in the text input area of the electronic device system where the currently selected character is to be entered.

76. The electronic device system as claimed in claim 46, wherein the method further comprises:
    providing a time window for iterating character presentation associated with the first key in the text area according to the predetermined order of the plurality of optional characters associated with the first key to respond one or more operations on the first key during the operation period, wherein the iterating allows presenting of the first subsequent character as the currently selected character in the text area in substitution for the first character; and
    extending the time window by extending the operation period of the first key for input of the currently selected character to the electronic device system in response to each subsequent operation based on the first key before expiration of the operation period;
    wherein the displaying of the menu does not terminate the time window for iterating character presentation while the operation of the second input device for entering the second character terminates the time window for iterating character presentation.

77. The electronic device system as claimed in claim 46, wherein the plurality of optional characters in the menu comprise letters associated with the first key in lowercase and uppercase.

78. The electronic device system as claimed in claim 46, wherein the menu comprise at least one candidate of autocompleted words derived from at least one character associated with the first key.

79. The electronic device system as claimed in claim 46, wherein the processor renders presentation of a character in the menu which is identical to the currently selected character in the text area distinctive in character presentation style from other characters in the menu, and a group of keys of the plurality of keys is associated with entirety of alphabets in a specific language, and the second input device is a second key of the input unit not belonging to the group of keys.

80. The electronic device system as claimed in claim 46, wherein the second input device comprises a second key of the input unit and comprises different operating positions, each of operating positions is operable to receive a press, and the operation on the second input device is a press on one of the operating positions of the second input device.

81. An electronic device system, comprising:
    an touch sensitive device comprising a plurality of keys which comprise physical keys with real mechanical structures or electronically displayable virtual keys, wherein each key of the plurality of keys is operable as a toggle key and is associated with a sequence of character candidates which comprises optional characters arranged in a specific arrangement for character input to the electronic device system, and two different keys in the plurality of keys are respectively associated with different sequences of character candidates, the plurality of keys comprise a first key; and
    a processor electronically connected the touch sensitive device and operable to present character information on a display when connected to the display, and operable to detect operation of a key of the touch sensitive device according to a character input method, the method comprising:
    detecting if a first operation of press on a first key of the plurality of keys conforms to a first input pattern or a second input pattern;
    if the first operation conforms to the first input pattern, associating the first key with a first character set of one or more character candidates and utilizes the first character set as a currently selected character set for character presentation associated with the first key, and presenting a first character in the first character set as a currently selected character for character input to the electronic device system in response to the first operation conforming to the first input pattern;
    if the first operation conforms to the second input pattern, associating the first key with a second character set of one or more character candidates different from the first character set and utilizes the second character set as the currently selected character set associated with the first key, and presenting a second character in the second character set as the currently selected character for character input to the electronic device system in response to the first operation conforming to the second input pattern, wherein the second character is different from the first character, and the currently selected character set is associated with the first key such that presentation of a subsequent character candidate in the currently selected character set as the currently selected character in substitution for the first character or the second character during character presentation associated with the first key is activated in response to a subsequent character operation based on the first key upon a condition that the currently selected character set comprises a plurality of character candidates associated with the first key;
    displaying a menu showing at least the currently selected character set on the display in response to the first operation, the menu comprise at least the first character set or the second character set; and
    selecting a first subsequent character in the menu as the currently selected character in substitution for the first character or the second character according to a first route of character presentation to traverse a plurality of character candidates in the menu in response to a first touch track based on the first key detectable by the touch sensitive device upon a condition that menu comprises a plurality of character candidates associated with the first key;

wherein the currently selected character is selected to be input to a text area of the electronic device system upon the end of character presentation associated with the first key, and the selecting of the first subsequent character as the currently selected character in response to the first touch track is performed even if the first touch track comprise a touch track outside of an area of the display representing the menu.

82. The electronic device system as claimed in claim 81, wherein the subsequent character operation comprises the first touch track, and the subsequent character candidate comprises the first subsequent character.

83. The electronic device system as claimed in claim 82, wherein the first touch track and a second touch track respectively comprise touch movements in different directions.

84. The electronic device system as claimed in claim 82, wherein the first operation of press conforming to the first input pattern comprises a short press on the first key, duration of the short press is less than a predetermined time interval, the first operation of press conforming to the second input pattern comprises a long press on the first key, duration of the long press is greater than the predetermined time interval, and the first touch track based on the first key does not conflict with the long press on the first key such that release of the first key is not required between the long press and the first touch track.

85. The electronic device system as claimed in claim 82, wherein at least two character candidates in the first route is reversed in the second route.

86. The electronic device system as claimed in claim 82, wherein arrangement of at least two character candidates in the first character set in the menu is reversed in the second character set in the menu.

87. The electronic device system as claimed in claim 82, wherein the plurality of character candidates associated with the first key comprise at least two classes of characters, which comprise a class of numerical characters and a class of alphabetical characters, and the first character set and the second character set respectively comprise different classes of characters.

88. The electronic device system as claimed in claim 82, wherein the first operation initiates an operation period of the first key, if the first key is associated with one of the first character set and the second character set as the currently selected character set, the processor performs switching of the currently selected character set by associating the other one of the first character set and the second character set with the first key as the currently selected character set in response to a second operation on the first key conforming to the second input pattern before expiration of the operation period of the first key.

89. The electronic device system as claimed in claim 88, wherein after associating the other one of the first character set and the second character set with the first key as the currently selected character set, the processor selects a third character in a first sequence of character candidates in the currently selected character set next to the first character as the currently selected character in substitution for the first character, wherein the third character comprises a character prior to the first character in the selected character set before the switching.

90. The electronic device system as claimed in claim 82, wherein the menu shows the currently selected character set and the currently selected character associated with the first key in the menu, each character in the menu is associated with a key of the electronic device system other than the first key, and the method further comprises:

inputting the specific character to the text area disregarding the currently selected character in response to an operation on a key of the electronic device system associated with a specific character in the menu.

91. The electronic device system as claimed in claim 82, wherein each key of the plurality of keys is operable to be toggled between a pressed state and a released state, the plurality of keys are arranged as a mechanical keyboard with mechanical structure or a electronically displayable virtual keyboard, and the first key is switchable between the pressed state and the released state and is not transitioned to a specialized state beyond toggling of the first key between the pressed state and the released state in response to the first operation conforming to the first input pattern or the second input pattern.

92. The electronic device system as claimed in claim 91, wherein the first input pattern represents a default input scheme of short press on the first key operable to select one optional character associated with the first key as the currently selected character according to the first character set, wherein duration of the short press is less than a predetermined time interval, and the second input pattern represents an alternative input scheme of long press on the first key operable to select one optional character associated with the first key as the currently selected character according to the second character set, wherein duration of the long press is greater than the predetermined time interval.

93. The electronic device system as claimed in claim 81, wherein the subsequent character operation comprises the first touch track or a subsequent press on the first key.

94. The electronic device system as claimed in claim 93, wherein after the presenting of the second character, the subsequent character candidate comprises a subsequent character next to the second character in the second character set according to a preset arrangement of the one or more character candidates in the second character set upon a condition that the subsequent press on the first key conforms to the first input pattern, and the subsequent character candidate comprises a subsequent character previous to the second character in the second character set according to the preset arrangement of the one or more character candidates in the second character set upon a condition that the subsequent press on the first key conforms to the second input pattern.

95. The electronic device system as claimed in claim 94, wherein the plurality of character candidates in the menu associated with the first key is arranged clockwise or counterclockwise in the menu.

96. The electronic device system as claimed in claim 94, wherein the first touch track and a second touch track respectively comprise clockwise and counterclockwise touch movements on the touch sensitive device, the menu comprises a left character and a right character on the right side of the left character, and the method further comprises:

if the left character is currently presented as the currently selected character, the processor selects the right character as the currently selected character in substitution for the left character in response to the first touch track; and if the right character is currently presented as the currently selected character, the processor selects the left character as the currently selected character in substitution for the right character in response to the second touch track.

97. The electronic device system as claimed in claim 93, wherein the menu shows the currently selected character set and the currently selected character associated with the first key in the menu, the processor maintains presentation of the menu on the display to show visual relationship between sequential selection of at least two characters in the menu in turn as the currently selected character and directions of the first touch track and a second touch track.

98. The electronic device system as claimed in claim 81, wherein the currently selected character is shown on a position in the text input area of the electronic device system where the currently selected character is to be entered.

99. The electronic device system as claimed in claim 81, wherein the touch sensitive device comprises the display and is operable as a touch screen, the plurality of keys comprise virtual keys displayed on the touch screen, the menu is displayed on the touch screen, and the selecting of the first subsequent character as the currently selected character by the first touch track is performed even if the first touch track is outside of the area representing the menu and a position representing the first subsequent character in the menu.

100. The electronic device system as claimed in claim 99, wherein a direction of a movement of the currently selected character on the menu from the first character or the second character to the first subsequent character is associated with a direction of the first touch track.

101. The electronic device system as claimed in claim 81, wherein the second character set comprises a plurality of character candidates associated with the first key and the number of character candidates in the second character set is more than the number of at least one character candidate of the first character set, the selecting of the first subsequent character in the menu comprises selection of one of the plurality of character candidates in the second character set in response to the first touch track following the first operation conforming to the second input pattern.

102. The electronic device system as claimed in claim 101, wherein the first character set comprises a plurality of character candidates.

103. The electronic device system as claimed in claim 81, wherein the electronic device system comprises a cell phone.

104. The electronic device system as claimed in claim 81, wherein the first character set comprises a plurality of character candidates associated with the first key and the number of character candidates of the first character set is more than the number of at least one character candidate of the second character set, the selecting of the first subsequent character in the menu comprises selection of one of the plurality of character candidates in the first character set in response to the first touch track following the first operation conforming to the first input pattern.

105. The electronic device system as claimed in claim 104, wherein the second character set comprises a plurality of character candidates.

106. The electronic device system as claimed in claim 81, wherein the first touch track based on the first key detectable by the touch sensitive device is performed during an operation period of the first key for input of the currently selected character to the electronic device system.

107. The electronic device system as claimed in claim 106, wherein the method further comprises:
  extending the operation period of the first key for input of the currently selected character to the electronic device system in response to each subsequent operation based on the first key before expiration of the operation period.

108. The electronic device system as claimed in claim 81, wherein the plurality of character candidates in the menu comprise letters associated with the first key in lowercase and uppercase.

109. The electronic device system as claimed in claim 81, wherein the menu comprise at least one candidate of auto-completed words derived from at least one character associated with the first key.

110. The electronic device system as claimed in claim 81, wherein the method further comprises:
  selecting another second subsequent character in the menu other than the first subsequent character as the currently selected character according to a second route of character presentation to traverse the plurality of character candidates in the menu in response to a second touch track based on the first key detectable by the touch sensitive device.

* * * * *